(12) United States Patent
Crouch

(10) Patent No.: US 12,358,812 B2
(45) Date of Patent: Jul. 15, 2025

(54) COMPUTERIZED CONTROL SYSTEM FOR A DESALINATION PLANT

(71) Applicant: BP Exploration Operating Company Limited, Middlesex (GB)

(72) Inventor: John Henry Crouch, Odell (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 877 days.

(21) Appl. No.: 15/734,507

(22) PCT Filed: Jun. 6, 2019

(86) PCT No.: PCT/GB2019/051580
§ 371 (c)(1),
(2) Date: Dec. 2, 2020

(87) PCT Pub. No.: WO2019/234440
PCT Pub. Date: Dec. 12, 2019

(65) Prior Publication Data
US 2021/0230017 A1    Jul. 29, 2021

(30) Foreign Application Priority Data

Jun. 8, 2018 (GB) ...................................... 1809495

(51) Int. Cl.
*C02F 1/00* (2023.01)
*B01D 61/02* (2006.01)
(Continued)

(52) U.S. Cl.
CPC ............ *C02F 1/008* (2013.01); *B01D 61/025* (2013.01); *B01D 61/027* (2013.01);
(Continued)

(58) Field of Classification Search
CPC ............ B01D 2311/06; B01D 2311/10; B01D 2311/14; B01D 2311/243;
(Continued)

(56) References Cited

U.S. PATENT DOCUMENTS 9,555,373 B2    1/2017  Williams
9,885,228 B2    2/2018  Wolf et al.
(Continued)

FOREIGN PATENT DOCUMENTS

CN    105060582 A    11/2015
CN    105960507 A     9/2016
(Continued)

OTHER PUBLICATIONS

PCT 1961/2020 Egyptian Office Action dated Nov. 10, 2022 (7 p.).
(Continued)

*Primary Examiner* — Terry K Cecil
(74) *Attorney, Agent, or Firm* — CONLEY ROSE, P.C.

(57) ABSTRACT

A control system configured to control operation of reverse osmosis (RO) array(s), nanofiltration (NF) array(s) and/or a blending system including a control panel (CP), regulatory controllers (RCs), and a supervisory controller (SC), wherein the SC is in signal communication with the CP, and with the RCs, wherein the SC is configured to: receive user inputs from the CP, and receive inputs from RCs regarding data from sensors, wherein the RCs are in signal communication with the plurality of sensors, wherein the RCs are configured to: receive data from the sensors, provide outputs to and receive permissions from the SC, and instruct devices in response to the received permissions from the SC, and wherein the SC is configured to: monitor trends in the inputs regarding and/or predict outcomes from data received from the RCs and determine the permissions for RCs based on the monitored trends and/or user inputs from the CP.

12 Claims, 4 Drawing Sheets

(51) Int. Cl.
  *B01D 61/12*   (2006.01)
  *B01F 23/40*   (2022.01)
  *B01F 35/82*   (2022.01)
  *B01F 101/49*  (2022.01)
  *C02F 1/44*    (2023.01)
  *C02F 103/08*  (2006.01)
  *E21B 43/20*   (2006.01)

(52) U.S. Cl.
  CPC ........... *B01D 61/029* (2022.08); *B01D 61/12* (2013.01); *B01F 23/40* (2022.01); *B01F 35/82* (2022.01); *C02F 1/441* (2013.01); *C02F 1/442* (2013.01); *B01D 2311/10* (2013.01); *B01D 2311/14* (2013.01); *B01D 2311/243* (2013.01); *B01D 2311/246* (2013.01); *B01D 2317/04* (2013.01); *B01D 2317/08* (2013.01); *B01F 2101/49* (2022.01); *C02F 2103/08* (2013.01); *C02F 2201/005* (2013.01); *C02F 2209/008* (2013.01); *C02F 2209/02* (2013.01); *C02F 2209/03* (2013.01); *C02F 2209/05* (2013.01); *C02F 2209/40* (2013.01); *C02F 2301/043* (2013.01); *E21B 43/20* (2013.01)

(58) Field of Classification Search
  CPC .......... B01D 2311/246; B01D 2313/70; B01D 2317/04; B01D 2317/08; B01D 61/025; B01D 61/026; B01D 61/027; B01D 61/029; B01D 61/12; B01F 2101/49; B01F 23/40; B01F 35/82; C02F 1/008; C02F 1/441; C02F 1/442; C02F 1/444; C02F 2103/08; C02F 2103/10; C02F 2201/005; C02F 2209/005; C02F 2209/008; C02F 2209/02; C02F 2209/03; C02F 2209/05; C02F 2209/40; C02F 2301/043; E21B 43/20; Y02A 20/131

See application file for complete search history.

(56) References Cited

U.S. PATENT DOCUMENTS

| | | |
|---|---|---|
| 2006/0144787 A1 | 7/2006 | Schmidt et al. |
| 2008/0185294 A1 | 8/2008 | Cai et al. |
| 2010/0006283 A1 | 1/2010 | Collins et al. |
| 2013/0213892 A1 | 8/2013 | Henthorne |
| 2014/0311980 A1 | 10/2014 | Weston et al. |
| 2015/0053596 A1 | 2/2015 | Kaageyama et al. |
| 2017/0209834 A1 | 7/2017 | Cohen et al. |
| 2017/0334747 A1 | 11/2017 | Cohen et al. |

FOREIGN PATENT DOCUMENTS

| | | |
|---|---|---|
| WO | 2007/138327 A1 | 12/2007 |
| WO | 2008/029124 A1 | 3/2008 |
| WO | 2014/127227 A1 | 8/2014 |
| WO | 2019/030343 A1 | 2/2019 |

OTHER PUBLICATIONS

English Translation of PCT 1961/2020 Egyptian Office Action dated Nov. 10, 2022 (2 p.).

Chinese Office Action dated Jul. 20, 2022, for Chinese Application No. 201980053563.8 (17 p.).

English Translation of Chinese Office Action dated Jul. 20, 2022, for Chinese Application No. 201980053563.8 (15 p.).

Cui, Hui et al., "Turpan-Hami Basin Oil and Gas Field Development Project," p. 406, Petroleum Industry Press, Aug. 1998 (3 p.).

PCT/GB2019/051580 International Search Report and Written Opinion dated Aug. 23, 2019 (15 p.).

COMPUTERIZED CONTROL SYSTEM FOR A DESALINATION PLANT

CROSS-REFERENCE TO RELATED APPLICATIONS

The present application is a 35 U.S.C. § 371 U.S. National Phase entry of, and claims priority to, PCT Application No. PCT/GB2019/051580 filed Jun. 6, 2019, which claims priority to British Patent Application No. 1809495.3, filed Jun. 8, 2018, both of which are incorporated herein by reference in their entireties for all purposes.

STATEMENT REGARDING FEDERALLY SPONSORED RESEARCH OR DEVELOPMENT

Not applicable.

TECHNICAL FIELD

This disclosure relates to a process of providing a low salinity injection water for an oil reservoir having a desired composition, and to a desalination system for producing such an injection water; more particularly, this disclosure relates to a process and system for producing water of controlled low salinity, controlled sulfate anion concentration and/or controlled multivalent cation concentration; still more particularly, this disclosure relates to a process and system for producing water of controlled low salinity, controlled sulfate anion concentration and/or controlled multivalent cation concentration via a computerized control system.

BACKGROUND

As described in International patent application WO 2008/029124, the disclosure of which is hereby incorporated herein by reference for purposes not contrary to this disclosure, water of low salinity can be injected into an oil-bearing formation of a reservoir in order to enhance the recovery of oil from the reservoir.

A problem associated with low salinity water-flooding is that desalination techniques may yield water having a lower than optimal salinity for continuous injection into an oil bearing reservoir during enhanced oil recovery (EOR). Indeed, the desalinated water may be damaging to the oil-bearing rock formation of the reservoir and may inhibit oil recovery, for example, by causing swelling or mobilization of clays such that the clays block the formation. Thus, there is an optimal salinity for the injection water that provides the benefit of enhanced oil recovery whilst mitigating the risk of formation damage, and, the optimum salinity will vary from formation to formation, and may vary within a single reservoir owing to the rock composition varying spatially across a reservoir (in a vertical and/or a transverse direction). Typically, where an oil-bearing formation comprises rock that contains high levels of swelling clays, formation damage may be avoided, while still releasing oil from the formation, when the injection water has a total dissolved solids content (TDS) in the range of 200 to 10,000 ppm, for example from 500 to 5,000 ppm, or 1,000 to 5,000 ppm.

A further problem associated with low salinity water-flooding is that for reservoirs susceptible to souring or scaling, the sulfate level of the low salinity injection water should typically be controlled. It is known that injection of a water that contains high levels of sulfate anions can stimulate the growth of sulfate reducing bacteria that produce hydrogen sulfide as a metabolite, resulting in souring of a reservoir. Scaling arises from deposition of mineral scale upon mixing of a sulfate containing injection water with a connate water containing precipitate precursor cations such as barium cations. Where it is desired to mitigate the risk of mineral scale formation, the level of sulfate anions in the supply of mixed water should be less than 40 ppm. However, where it is desired to mitigate the risk of souring in a reservoir, the level of sulfate anions in the supply of mixed water should be as low as possible, for example, less than 7.5 ppm, or less than 5 ppm.

Thus, it may not be desirable to mix a desalinated water of low multivalent cation content with a high salinity water such as seawater owing to the high sulfate anion content and/or high multivalent cation content of the high salinity water. The high sulfate anion content of such mixed water streams may result in reservoir souring and/or the precipitation of unacceptable levels of insoluble mineral salts (scale formation) when the injected water contacts precipitate precursor cations, such as barium, strontium and calcium cations, that are commonly present in the connate water of the formation. In addition, mixing of desalinated water with a high salinity water, such as seawater, may result in the mixed water stream containing unacceptable levels of multivalent cations, in particular, calcium and magnesium cations. In embodiments, in order to achieve incremental oil recovery with a low salinity injection water, the ratio of the concentration of multivalent cations in the low salinity injection water to the concentration of multivalent cations in the connate water of the reservoir should be less than 1, and in some instances can be even lower, for example, less than 0.9, less than 0.8, less than 0.6, or less than 0.5.

As described in International patent application WO 2007/138327, the disclosure of which is hereby incorporated herein by reference for purposes not contrary to this disclosure, one way in which the salinity of a water supply of overly low salinity might be increased is by blending with water of higher salinity. According to WO 2007/138327, this may be achieved by the steps of: substantially desalinating a first feed supply of water to provide a first supply of treated water of low salinity; treating a second feed supply of water to provide a second supply of treated water having a reduced concentration of divalent ions in comparison to the second feed supply and a higher salinity than the first supply of treated water; and mixing the first supply of treated water and the second supply of treated water to provide a supply of mixed water having a desired salinity suitable for injection into an oil bearing reservoir.

In embodiments of the invention of WO 2007/138327, the first feed supply is substantially desalinated by a reverse osmosis process, while the step of treating the second feed supply of water is, in embodiments, performed by nanofiltration. Nanofiltration is commonly used in the oil industry to remove sulfate ions from a source water. The treated water can then be injected into a formation without the risk of forming unacceptable levels of insoluble mineral salts when the injected water contacts precipitate precursor cations present in the connate water of the formation. The invention of WO 2007/138327 therefore permits the supply of a mixed water having the desired salinity suitable for injection into the oil bearing reservoir and having a reduced level of sulfate anions thereby mitigating the risk of souring and of mineral scale precipitation either within the formation or in production wells.

SUMMARY

Herein disclosed is a control system configured to control the operation of one or more reverse osmosis (RO) arrays, one or more nanofiltration (NF) arrays, a blending system, or a combination thereof within a desalination plant, wherein the control system comprises: a control panel (CP); a plurality of regulatory controllers (RCs); and a supervisory controller (SC), wherein the SC is in signal communication with the CP, and with each of the plurality of RCs, wherein the SC is configured to: receive user inputs from the CP, and receive inputs from the plurality of RCs regarding data from a plurality of sensors within the desalination plant, wherein each of the plurality of RCs is in signal communication with the plurality of sensors, wherein the plurality of RCs is configured to: receive data from one or more of the plurality of sensors, provide outputs to and receive permissions from the SC, and instruct one or more of a plurality of devices of the desalination plant in response to the received permissions from the SC, and wherein the SC is configured to: monitor trends in the inputs regarding and/or predict outcomes from data received from the plurality of RCs and determine the permissions for each of the RCs based on the monitored trends, user inputs from the CP, or a combination thereof.

Also disclosed herein is a desalination plant comprising: a water inlet line; one or more reverse osmosis (RO) arrays in fluid communication with the water inlet line, wherein each of the one or more RO arrays is configured to receive an RO feed water and produce an RO permeate and an RO concentrate; a nanofiltration (NF) array in fluid communication with the water inlet line, the one or more RO arrays, or both, wherein the NF array is configured to produce an NF permeate and an NF concentrate; a blending system, wherein the blending system comprises: an RO permeate feed line, an NF permeate feed line, a blending point configured to blend RO permeate from the RO permeate feed line and NF permeate from the NF permeate feed line to form a blended low salinity injection water, and a discharge line configured to deliver the blended low salinity injection water to an injection system; a plurality of valves and pumps configured to adjust the flow rates or pressures of various streams within the desalination plant; a plurality of sensors configured to measure the flow rate, pressure, temperature, composition, or a combination thereof of various streams within the desalination plant; a control system, wherein the control system is configured to: control the operation of the one or more RO arrays, the NF array, and the blending system to within operating parameters, and maintain a composition of the blended low salinity injection water within an operating envelope, wherein the control system comprises a plurality of regulatory controllers (RCs), a supervisory controller (SC), and a control panel, wherein the SC is in electronic communication with the CP from which it receives user inputs and with each of the plurality of RCs from which it receives inputs regarding the data from the sensors, wherein each of the plurality of RCs receives data from one or more of the plurality of sensors, provides outputs to and receives permissions from the SC, and instructs one or more of the plurality of valves and pumps in response to the received permissions from the SC, and wherein the SC monitors trends in the inputs received from the plurality of RCs and determines permissions for each of the RCs based on the monitored trends, user inputs from the control panel, or a combination thereof.

Further disclosed herein is a method of producing injection water, the method comprising: producing a reverse osmosis permeate stream; producing a nanofiltration permeate stream; blending at least a portion of the reverse osmosis permeate stream with at least a portion of the nanofiltration permeate stream, a high salinity stream, or a combination thereof to provide a blended low salinity water stream; and controlling the production of the RO permeate stream, the NF permeate stream, and the blending to within operating parameters, and maintaining a composition of the blended low salinity water stream within an operating envelope via a control system comprising a plurality of regulatory controllers (RCs), a supervisory controller (SC), and a control panel, wherein the SC is in signal communication with the CP from which it receives user inputs and with each of the plurality of RCs from which it receives inputs regarding data from a plurality of sensors, wherein each of the plurality of RCs receives data from one or more of the plurality of sensors, provides outputs to and receives permissions from the SC, and instructs one or more of a plurality of valves and pumps in response to the received permissions from the SC, and wherein the SC monitors trends in the inputs regarding the data received from the plurality of RCs and determines permissions for each of the RCs based on the monitored trends, user inputs from the control panel, or a combination thereof.

Also disclosed herein is a method of controlling a composition of an injection fluid, the method comprising: receiving, by a supervisory controller (SC) of a control system, one or more composition parameter targets for an injection fluid; and automatically adjusting, via communication of permissions from the supervisory controller to one or more regulatory controllers (RCs) of the control system in communication with one or more valves within a desalination plant, a state of the one or more valves, to produce an injection fluid meeting the one or more composition parameters.

While multiple embodiments are disclosed, still other embodiments will become apparent to those skilled in the art from the following detailed description. As will be apparent, certain embodiments, as disclosed herein, are capable of modifications in various aspects without departing from the spirit and scope of the claims as presented herein. Accordingly, the detailed description hereinbelow is to be regarded as illustrative in nature and not restrictive.

BRIEF DESCRIPTION OF THE DRAWINGS

The following figures illustrate embodiments of the subject matter disclosed herein. The claimed subject matter may be understood by reference to the following description taken in conjunction with the accompanying figures, in which:

DETAILED DESCRIPTION

Figure 1:
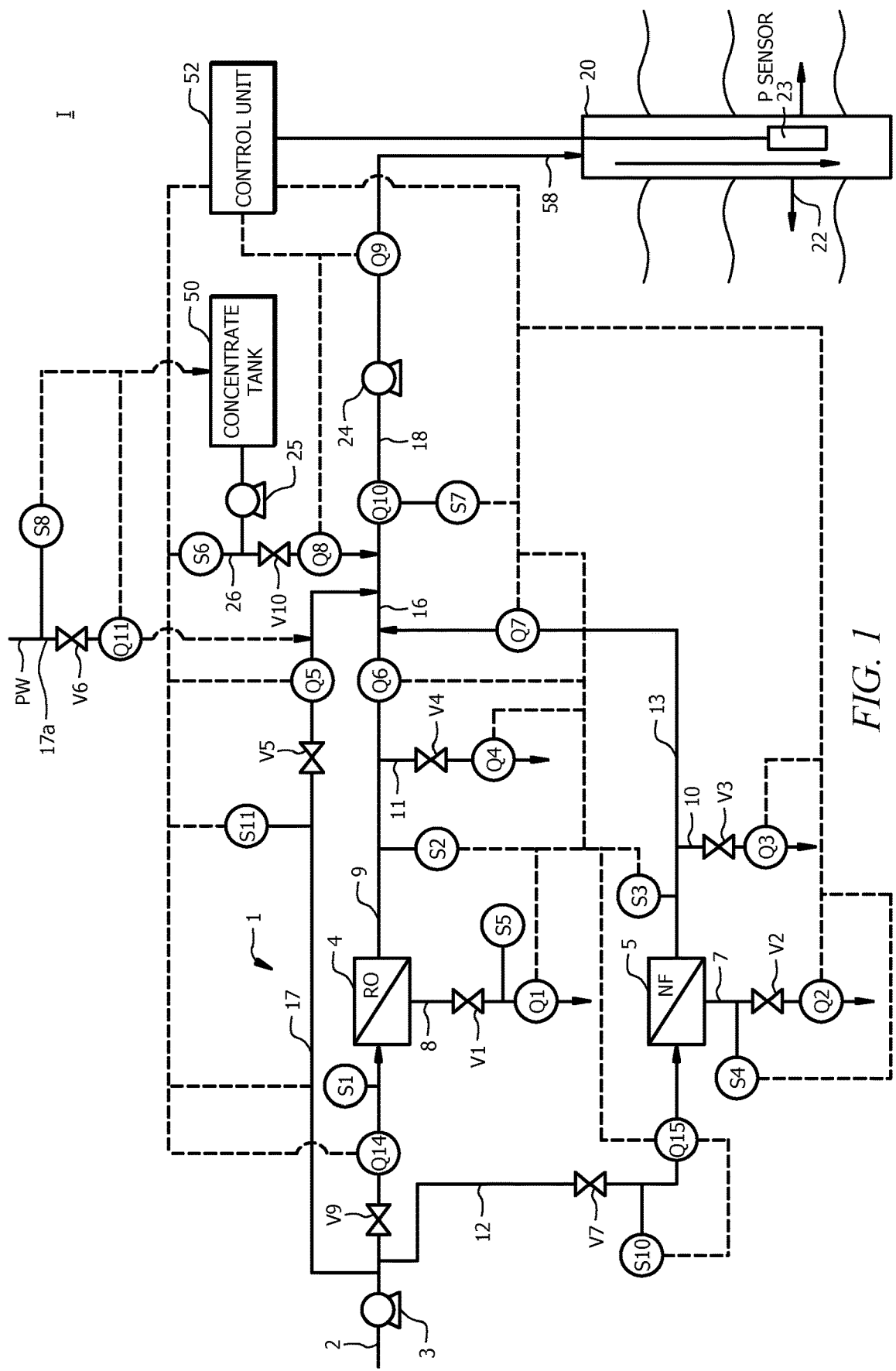
FIG. 1 is a schematic diagram of a desalination system operable via a computerized control system, according to an embodiment of this disclosure.

Throughout the following description the following terms are referred to:

As utilized herein, "membrane" refers to elements for microfiltration (MF), ultrafiltration (UF), reverse osmosis (RO), or nanofiltration (NF). Technically, MF/UF elements can be classified as filters, but, for simplicity, are referred to herein as membranes.

"Low salinity" water is the water resulting from the removal of at least a portion of the salt (e.g., NaCl) or other total dissolved solids (TDS) from a high salinity feed water or produced water (PW). As used herein, low salinity water can be water having a salinity or TDS content of less than 10,000, 7,500, or 5,000, or in the range of from 200 to 10,000, from 500 to 5,000, or from 1,000 to 5,000 ppm.

"High salinity feed water" is the feed water for a desalination plant and is typically seawater (SW), estuarine water, aquifer water or mixtures thereof.

"Softened water" is the water resulting from the removal of at least some amount of hardness ions (e.g., multivalent cations including magnesium and calcium) from a high salinity feed water or PW.

An "ultrafiltration (UF) filtration unit" comprises a pressure vessel containing one or more UF elements, for example, between 1 and 8 membrane elements, between 1 and 4, or between 4 and 8 UF membrane elements.

A "reverse osmosis (RO) filtration unit" comprises a pressure vessel, alternatively called a housing, containing one or more RO membrane elements, for example between 1 and 8 RO membrane elements, or between 4 and 8 RO membrane elements.

A "nanofiltration (NF) filtration unit" comprises a pressure vessel containing one or more NF elements, for example between 1 and 8 membrane elements, or between 4 and 8 NF membrane elements.

A reverse osmosis (RO) "stage" or "array" of a desalination plant is a group of RO filtration units connected together in parallel. Similarly, a nanofiltration (NF) "stage" or "array" of a desalination plant is a group of NF filtration units connected together in parallel.

A "membrane block" comprises stages of RO and NF filtration connected together to provide concentrate staging and typically shares common valving and piping. A membrane block or two or more membrane blocks may be mounted on a skid.

"Connate water" is the water present in the pore space of an oil-bearing layer of a reservoir.

"Aqueous drive fluid" is an aqueous fluid that may be injected into an injection well after injection of a low pore volume (PV) slug of the blended low salinity injection water.

"Bank of oil" is a term well known to the person skilled in the art and refers to a portion of the layer(s) of reservoir rock where the oil saturation is increased because of the application of an enhanced oil recovery process that targets immobile oil.

"Swept pore volume (PVR)" is the pore volume of the layer(s) of reservoir rock swept by the injected fluids (low salinity injection water and any aqueous drive fluid) between an injection well and production well, averaged over all flow paths between the injection well and production well. Where an injection well has two or more associated production wells, the term "swept pore volume" means the pore volume of the layer(s) of reservoir rock swept by the injected fluids between the injection well and its associated production wells.

"Slug" is a low pore volume of a fluid that is injected into an oil-bearing layer of a reservoir. The values of pore volumes given for the slugs of low salinity injection water are based on the swept pore volume (PVR) of the layer(s) of reservoir rock.

"TDS content" is to the total dissolved solids content of an aqueous stream and typically has units of mg/L.

The unit "ppmv" is parts per million on a volume basis and is equivalent to the unit "mg/L". Unless noted otherwise, when utilized herein, "ppm" means "ppmv".

The present disclosure relates to a computerized control system having a plurality of controllers for use in providing a mixed or 'blended' water stream of controlled composition (e.g., salinity, sulfate anion content, etc.) suitable as an injection water for a low salinity waterflood whilst mitigating the risk of formation damage, and/or controlling souring in the reservoir. The desired composition of blended injection water can vary during the operation of the desalination plant, for example, during commissioning of a well. The herein described computerized control system and method may be utilized to control the operating conditions of such a desalination process or plant.

The computerized control system and method of this disclosure can be utilized to control operation of a desalination plant having a distributed control scheme. FIG. 1 is a schematic diagram of a desalination system I operable via a computerized control system, according to an embodiment of this disclosure. Although referred to with reference to a low salinity EOR injection water, the herein-disclosed computerized control system may also be utilized to control production of a softened water, in embodiments, wherein the 'desalination' system or plant comprises a water softening system or plant.

The desalination plant comprises an RO/NF membrane block 1 of a desalination plant for treating a feed water 2 (typically seawater); a blending system comprised of various flow lines for forming a blended low salinity injection water stream of variable composition; one or more control units or systems 52 for controlling the operation of the desalination plant and for controlling blending of the low salinity injection water stream in the blending system; an optional concentrate tank 50 and pump 25 for a clay stabilizing concentrate; and an injection system for an injection well 20. While referred to as an RO/NF membrane block 1, in embodiments, solely RO or solely NF may be contained within RO/NF membrane block 1. That is, RO/NF can mean RO only, NF only, or a combination of RO and NF, in embodiments.

Figure 2:
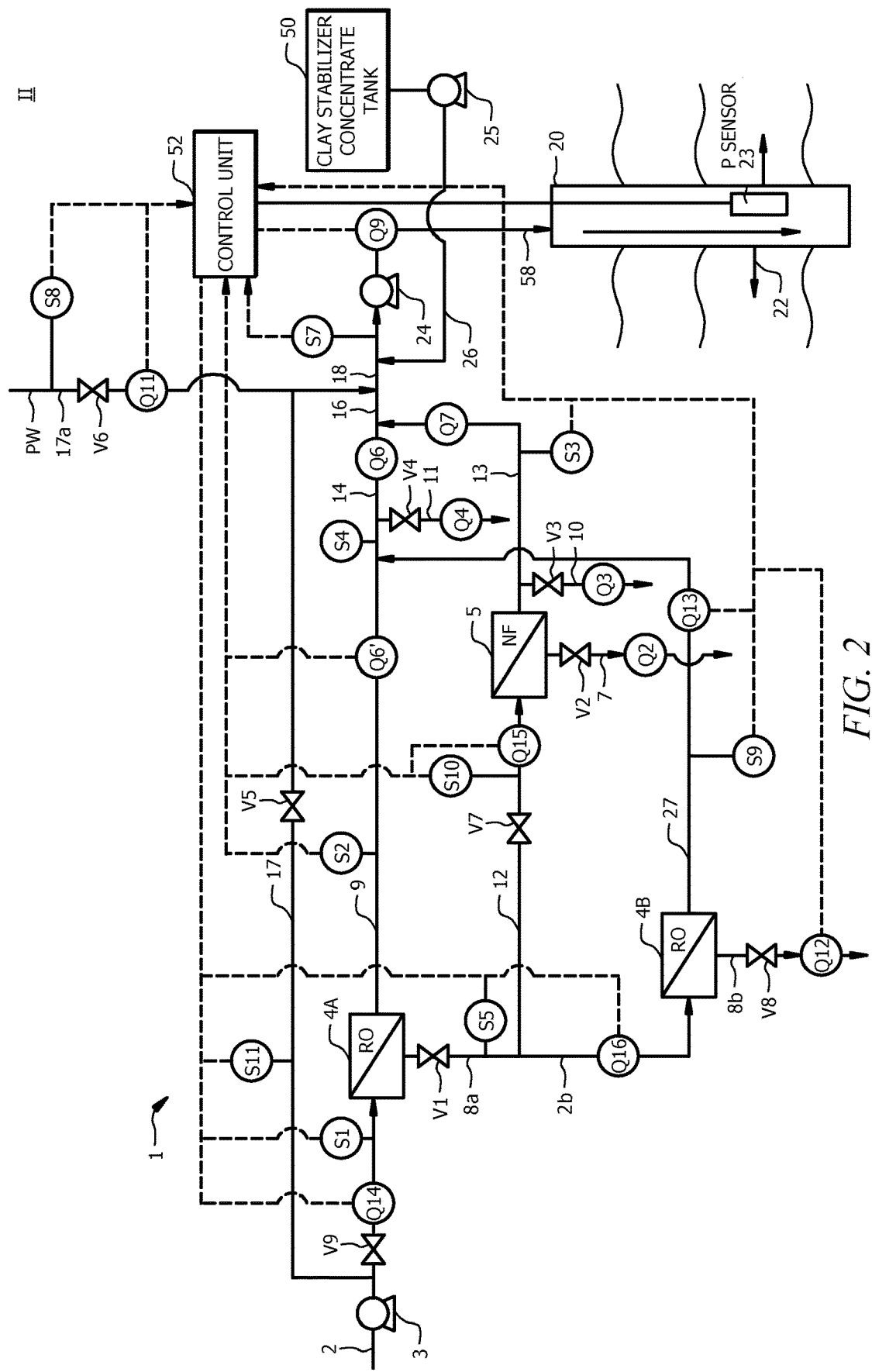
FIG. 2 is a schematic diagram of a desalination system operable via a computerized control system, according to an embodiment of this disclosure.

Membrane block 1 of desalination system I of the embodiment of FIG. 1 comprises a feed pump 3, an RO array 4 and an NF array 5. Each array may be either a single or multistage array. RO array 4 comprises a plurality of RO units. NF array 5 comprises a plurality of NF units. Typically, the number of units of the RO array and of the NF array are chosen to match the required production capacity of RO permeate 9 and NF permeate 13 for the injection water stream 18 during the main phase of the low salinity waterflood. The desalination plant may also be provided with a by-pass line 17 for the feed water 2, a line 17a for the blending of produced water (PW) with the RO/NF water, or both. Both the RO array and the NF array may have the same feed water (for example, SW or ultrafiltered (UF) water) as shown in FIG. 1. However, it is also envisaged that RO concentrate (also referred to in the art as "retentate") from a first RO stage or array may be divided to form a feed stream for a second RO stage or array and for an NF array, as shown in the embodiment of FIG. 2, described further hereinbelow.

In the configuration of FIG. 1, feed pump 3 pumps feed water 2 to the RO array 4 where the feed water is separated into an RO permeate (that flows through RO permeate line 9) and an RO concentrate (that flows through RO concentrate line 8) and, via feed line 12, to NF array 5 where the feed water is separated into an NF permeate (that flows through NF permeate feed line 13) and NF concentrate (that flows through NF concentrate line 7). As NF units are typically operated at a lower pressure than RO units, the pressures of the feed water to the RO and NF arrays may be adjusted (for example, using a booster pump for the RO feed or a pressure let down valve (e.g., valve V7) for the NF feed) to match the operating pressures of the RO units of the RO array 4 and the NF units of the NF array 5. Optionally, the feed pump 3 pumps a portion of the feed water (for example, SW) through the by-pass line 17 to the blending system.

Valves V1 and V2 may be at least partially open to provide a bleed of RO concentrate line 8 and NF concentrate line 7, respectively, from the desalination plant. Typically, the RO concentrate and NF concentrate bleed streams are discharged to a body of water (e.g., the sea) via lines 8 and 7, and valves V1 and V2, respectively. The NF permeate may be injected into the RO permeate line 9 in the blending system to form a combined RO/NF permeate stream that flows through RO/NF permeate stream line 16. Optionally, the combined RO/NF permeate stream also includes SW, PW, and/or a clay stabilizing concentrate (added via feed lines 17, 17a and/or 26, respectively).

The fluids produced from production wells are passed to a production facility which may optionally connect to a main production line. The produced fluids are separated in the production facility into an oil stream, gaseous stream and a produced water (PW) stream. A portion or the entirety of the PW stream may be blended with the low RO/NF stream (e.g., in PW blend line 17a) to provide the blended low salinity injection water(s) in line 18.

The control unit 52, described in detail hereinbelow, may monitor pressure sensor 23 for any increase in pressure in the injection wells 20 adjacent the oil-bearing interval in the region 22 of the reservoir. Alternatively, or in addition, the control unit 52 may monitor the flow sensor Q9 located downstream of the injection pump(s) 24 for any decrease in flow rate. Both an increase in pressure in the injection well and a decrease in flow rate downstream of the injection pump(s) 24 may be indicative of an unacceptable decrease in injectivity arising from formation damage. Values for a maximum permitted increase in pressure in the injection well 20 and/or values for a maximum permitted decrease in flow rate in the injection line 58 may be inputted into the control unit 52 (e.g., into supervisory controller(s) 55 thereof) where these values are correlated with an acceptable decrease in injectivity. If the pressure in injection well 20 adjacent the oil-bearing interval increases to a value that approaches or reaches the maximum permitted increase in pressure or the flow rate downstream of the injection pump(s) in the injection line 58 decreases to a value that approaches or reaches the maximum permitted decrease in flow rate, the control unit 52 may select a preferred operating envelope for the composition of the blended low salinity injection water stream that is predicted to reduce the risk of formation damage in the region of the oil-bearing region or interval 22 of reservoir. For example, preferred operating envelope(s) for the composition(s) of the blended low salinity injection water(s) may be defined by one or more of: higher boundary values for the TDS; higher boundary values for divalent cation content (in particular calcium cation content); or, higher boundary values for the one or more clay stabilizer additives. The control unit 52 may then control, as detailed hereinbelow, the operation of the desalination plant to adjust the composition of the combined RO/NF permeate stream line 16 such that the blended low salinity injection water has a composition falling within the preferred operating envelope for the region(s) of the oil-bearing layer of the reservoir. For example, this may be achieved by the control unit 52 sending instructions to: increase the amount of RO permeate dumped via the RO permeate dump line 11 by increasing the degree of opening of throttle valve V4; to increase the divalent cation content of the blended low salinity injection water stream by increasing the amount of SW blended with the combined RO/NF permeate stream by increasing the degree of opening of throttle valve V5; to increase the divalent cation content of the blended low salinity injection water stream by increasing the amount of PW blended with the combined RO/NF permeate stream by increasing the degree of opening of throttle valve V6; and/or, to increase the amount of clay stabilizing concentrate in the blended low salinity water stream 18 by increasing the degree of opening of throttle valve V10. The control unit 52 may monitor the impact of the change in operation of the desalination plant on the flow rate or composition of the low salinity injection water stream 18 (using flow rate sensor Q9 and/or Q10, and sensor S7 respectively) to determine if the adjustments to the operation of the plant have resulted in the flow rate and compositions of the blended low salinity injection water falling within the preferred operating envelope for the region(s) of the reservoir and, if necessary, may make further adjustments to the operation of the plant to achieve compositions within a more preferred operating envelope that provides further assurance against the risk of formation damage. Thus, the computerized control system of this disclosure utilizes a control unit 52 with a feedback loop which enables the system to produce a blended low salinity injection water stream having a composition that avoids or mitigates the risk of formation damage in the region(s) of the oil-bearing layer of the reservoir.

After a low pore volume slug of the blended low salinity injection water has been injected into injection well 20, an aqueous drive fluid, for example, produced water (PW) or a blend of SW and PW may be injected into injection well 20 via injection line 58 for driving the low pore volume slug and hence a bank of released oil towards a production well. Accordingly, the RO permeate and NF permeate streams are no longer required for injection well 20 and may be diverted for producing blended low salinity injection water(s) for at least one injection well penetrating a further region of the reservoir.

The blend ratio of NF permeate to the RO permeate streams may be adjusted by varying the degree of opening of the throttle valves on the RO permeate dump line 11 (valve V4) or NF permeate dump line 10 (valve V3) to alter the composition of the injection water that is pumped into the injection well 20 via one or more injection pumps 24.

FIG. 2 shows a more complex desalination system II for providing a mixed or blended water stream of controlled composition for use as injection water for a low salinity waterflood whilst mitigating the risk of formation damage, and controlling souring in the reservoir. System II comprises a RO/NF membrane block 1 of a desalination plant for treating a feed water 2. In the embodiment of FIG. 2, membrane block 1 comprises a feed pump 3, an RO section comprising a first RO array or stage 4A and a second RO array or stage 4B, and an NF array or stage comprising single NF stage 5. Each RO array or stage 4A/4B comprises a plurality of RO units. The NF array or stage 5 comprises a plurality of NF units. To maintain improved or optimum operation of the membrane separation process, the second RO array or stage 4B typically comprises fewer RO units than the first RO array or stage 4A.

The membrane blocks 1 of the embodiments of FIGS. 1 and 2 comprise various valves V1 to V10 and various conduits configured to provide the flow paths described herein. Valves V1 to V6 and V10 can be throttle valves that may be set to various intermediate positions, while valve V7 may be a pressure let-down valve, in embodiments. The flows and pressures through the membrane block 1 may be controlled by the feed pump 3, valves V1 to V9 or any combination thereof. In embodiments, a variety of flow rate sensors Q1 to Q16 are provided for determining the flow rates of the various lines in desalination systems I and II of FIGS. 1 and 2. Flow rate data is sent to the control system 52 (e.g., to regulatory controllers 56 (RCs 56) thereof, as described further hereinbelow) via electrical signal lines (the dotted lines in FIGS. 1 and 2). Sensors S1 to S11 are also provided to determine the composition (e.g., the total concentration of the TDS, the concentration of individual ions for example, by measuring conductivity), temperatures, pressures, or a combination thereof in the various flow lines. The sensed data can be sent to the control system 52 (e.g., to RCs 56 of control system 52, as described below) via electrical signal lines, or wirelessly.

In the configuration of FIG. 2, feed pump 3 pumps feed water 2 to the first RO stage or array 4A where the feed water 2 is separated into a first stage RO permeate 9 and a first stage or array RO concentrate 8a. Optionally, the feed pump 3 pumps a portion of the feed water (SW) through the SW by-pass line 17. The first stage or array RO concentrate 8a is divided at a branch point to form a feed 2b for the second RO stage or array 4B and a feed line 12 for the NF stage or array 5. As described below, the flows and pressures through the membrane block 1 may be adjusted (via the herein-disclosed computerized control system and control unit 52) so that the pressure of the feed 2b to second RO array or stage 4B matches the operating pressure of the second RO stage or array 4B. The pressure of the feed in feed line 12 to the NF stage or array 5 may be adjusted (e.g., using a pressure let-down valve V7) to match the operating pressure of the NF stage or array 5. If necessary, the pressure of the feed 8b for the second RO array or stage 4B may be increased using a booster pump to above the minimum operating pressure of the second RO array or stage 4B. Alternatively, a back-pressure valve or restriction orifice may be located on the conduit for the first stage or array RO permeate 9 to increase the pressure of the first array or stage RO concentrate 8a to above the minimum operating pressure of the second RO stage or array 4B.

The second RO stage or array 4B separates the feed 2b into a second stage or array RO permeate line 27 and a second stage or array RO concentrate 8b that is discharged from the membrane block 1. Thus, in embodiments, valve V8 can be at least partially open to provide a bleed of second RO array or stage RO concentrate 8b. The second stage or array RO permeate in second stage or array RO permeate line 27 is then combined with the first stage or array RO permeate 9 to form a combined RO permeate stream 14.

The NF stage or array 5 separates feed in feed line 12 into an NF permeate 13 and an NF concentrate 7 that is discharged from the membrane block 1. Thus, in embodiments, valve V2 can be at least partially open to provide a bleed of NF concentrate 7. The NF permeate 13 is then injected into the combined RO permeate 14 to form an RO/NF permeate stream line 16.

The blend ratio of NF and RO permeate streams may be adjusted, for example via the herein-disclosed computerized control system, by varying the degree of opening of the throttle valves (V4) on the RO permeate dump line 11 or (V3) on the NF permeate dump line 10 to alter the composition of the injection water that is pumped into the injection well 20 via one or more injection pumps 24.

As discussed herein, a planned concentration profile for reduction of the TDS concentration (or a planned concentration profile for changing the concentration of one or more ions in the injection water) can be inputted into the control system 52 (e.g., via a control panel 53, described hereinbelow). The control system 52 either monitors the pressure adjacent the hydrocarbon-bearing interval 22 of the injection well 20 using pressure sensor 23 or monitors the flow sensor Q9 located downstream of the injection pump(s) 24 of the injection system for a decrease in flow rate (both of which would be indicative of a decrease in injectivity arising from formation damage). The control system 52 then changes the composition of the injection water 18 in response to an unacceptable decrease in injectivity by, for example, increasing the TDS concentration of the injection water 18, increasing the divalent cation content of the injection water 18 (in particular calcium cation content) by blending an increased amount of SW and/or PW via feed water bypass line 17 and/or PW blending line 17a, and/or by adding an increased amount of clay stabilizing concentrate from the concentrate tank 50 to RO/NF permeate stream line 16 via pump 25. In embodiments, the composition of the injection water 18 is determined using sensor S7. In embodiments, the change in composition is automated such that the composition is controlled in real time along a planned concentration profile (inputted into the control unit 52, as described hereinbelow) for reaching the target composition of the low salinity water during a main phase of the low salinity waterflood or along a planned concentration profile (inputted into the control unit 52) for dealing with an upset condition. The upset condition may comprise a reduction in injectivity as evidenced by a decrease in flow rate at sensor Q9/Q10 or an increase in pressure in the wellbore of injection well 20 adjacent the hydrocarbon bearing region or interval 22 of the reservoir. Upper limits for the reduction in flow rate or the increase in pressure can also be inputted into the control system 52 (e.g., via a control panel (CP) 53, described in more detail hereinbelow). The control system 52 (e.g., a supervisory controller 55 thereof, described in detail hereinbelow) may send instructions (e.g., to one or more regulatory controllers (RC) 56) to alter the blend ratio of RO permeate 9 and NF permeate 13 by changing the opening of the throttle valves V4 and/or V3 to achieve the planned concentration profile or to deal with the upset condition. The control unit or system 52 may also, as detailed hereinbelow, manipulate the concentration of individual ions in the injection water 18 by controlling the amount of feed water that is optionally mixed with the RO permeate 9 and NF permeate 13 blended stream 14 and of any optional clay stabilizing concentrate comprising clay stabilizing ions that is mixed with this stream to form the injection water stream 18.

Figure 3:
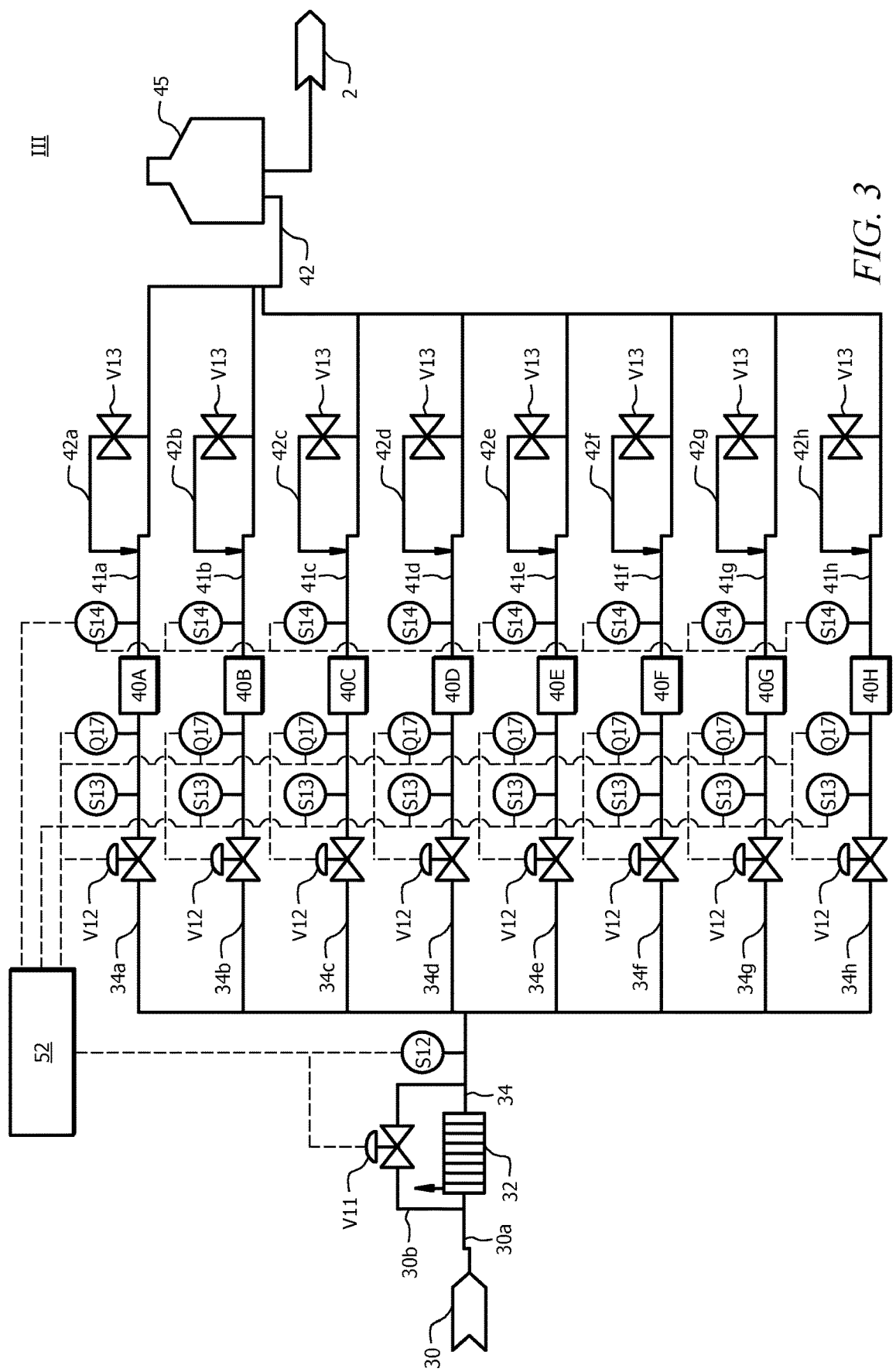
FIG. 3 is a schematic diagram of an ultrafiltration section of a desalination system operable via a computerized control system, according to an embodiment of this disclosure.

The feed water in line 2 of FIGS. 1 and 2 may be an ultrafiltered (UF) water, such as an ultrafiltered seawater (SW). In such embodiments, a desalination system I, II controlled via the herein-disclosed computerized control system may thus further comprise an ultrafiltration section configured to subject a high salinity feed water to ultrafiltration. For example, FIG. 3 depicts an UF section III comprising 8 ultrafiltration skids, 40A-40H. Each UF skid 40A-40H contains therein a plurality of UF vessels or units, and each UF unit or vessel contains therein a plurality of UF elements or filters. The UF units and membranes may be any known to those of skill in the art. In embodiments, the UF units or membranes comprise dead-end membranes as described in International Patent Application No. PCT/EP2017/067443 and published as WO/2018/015223, the disclosure of which is hereby incorporated herein in its entirety for purposes not contrary to this disclosure.

Within the UF skids, particulates are removed from a feed water introduced via UF feed water inlet line(s) 34, to provide a UF filtrate water removed from the UF skids via UF outlet line(s) 41. For example, feed water may be introduced into UF skids 40A, 40B, 40C, 40D, 40E, 40F, 40G, 40H via lines 34A, 34B, 34C, 34D, 34E, 34F, 34G, 34H, respectively, and ultrafiltered water removed from UF skids 40A, 40B, 40C, 40D, 40E, 40F, 40G, 40H via UF outlet lines 41A, 41B, 41C, 41D, 41E, 41F, 41G, 41H, respectively. The UF water in UF outlet lines 41A, 41B, 41C, 41D. 41E, 41F, 41G, 41H may be combined to provide UF water in UF line 42. The feed water in feed water line(s) 34 may comprise sea water (SW), brackish water, aquifer water, PW, or a combination thereof, and may be introduced to the UF skid(s) via one or more high pressure pump(s) (e.g., sea water lift pumps), heat exchangers, and the like. For example, as shown in the embodiment of FIG. 3, a portion 30a of the feed water from feed water feed pumps and coarse filter(s) in line 30 can pass through heat exchanger 32 prior to introduction into UF skids via line(s) 34. A line 30b may be utilized to bypass heat exchanger 32. The UF water may be stored in a buffer tank 45 prior to introduction to downstream RO/NF membrane block 1 (of FIGS. 1 and 2) via line 2. The UF section III may comprise a plurality of pumps, valves V, and/or sensors, S and Q. For example, as detailed further hereinbelow, a UF section III can comprise one or more of sensors S12, S13, S14, and Q17, valves V11, V12 and V13. The UF section III may remove a majority of the suspended solids (e.g., 99% of suspended solids having a diameter of greater than 0.02 micrometer) to provide a UF water in line 42/2.

The desalination system controlled via the herein-disclosed computerized control system comprises a plurality of valves (e.g., valves V1 to V13 of FIGS. 1-3) and various flow lines (conduits) configured to provide the flow paths described below. Valves V1 to V13 may be throttle valves and the degree of opening of the throttle valves (e.g., fully open position, fully closed position, or various intermediate positions) may be set by the control unit 52 (e.g., via RCs 56 thereof, as described hereinbelow), and are detailed further hereinbelow. For example, as noted above, the control unit 52 may control the flows and pressures through the membrane block 1 by controlling the feed pump 3, valves V1 to V13 or any combination thereof. For clarity, electrical connections between the control unit 52 and various units it controls, such as, without limitation, the feed pump 3, and the valves V1 to V13 are omitted from FIGS. 1-3. Further, as noted below, in some embodiments, communications between the control unit 52 and various units it controls may comprise wireless communications, such as Wi-Fi or Bluetooth. A system and method of desalination according to this disclosure may or may not comprise each of the valves shown in the figures, and may comprise additional valves not mentioned herein. Such will be apparent to those of skill in the art.

The desalination system controlled via the herein-disclosed computerized control system comprises a number of sensors, indicated in the Figures as 'S' and 'Q'. For example, as described in more detail hereinbelow with reference to control system 52, the desalination system can comprise a plurality of flow rate sensors Q. In the embodiments of FIGS. 1-3, flow rate sensors Q1 to Q17 are provided for determining the flow rates in the various flow lines. Flow rate data may be sent from the flow rate sensors Q1 to Q17 to the control unit 52 (e.g., to RCs 56 thereof, described further below) via electrical signal lines (the dotted lines in FIGS. 1-3) or through wireless communications, such as Wi-Fi or Bluetooth communications. A system and method of desalination according to this disclosure may or may not comprise each of the flow rate sensors Q shown in the figures, and may comprise additional flow rate sensors not mentioned herein. Such will be apparent to those of skill in the art. For example, the flow rate sensors Q1 and Q2 in the embodiment of FIG. 1 on the RO concentrate and NF concentrate lines 8 and 7, respectively, may be omitted, in embodiments.

Again as described in more detail hereinbelow with reference to control system 52, the desalination system controlled via the computerized control system and method provided in this disclosure can comprise a plurality of sensors S configured to measure another parameter within the desalination system, such as, without limitation, temperature, pressure, flow rate, composition (e.g., concentration of total dissolved solids (TDS), conductivity, concentration(s) of individual ion(s) or types of ion(s), such as multivalent cations or divalent cations, etc.) in the various flow lines. For example, data can also be sent from the sensors S1-S14 of FIGS. 1-3 to the control unit 52 (e.g., to RCs 56 thereof, as described below) via electrical signal lines (dotted lines shown in FIGS. 1-3) or through wireless communications, such as Wi-Fi or Bluetooth communications. A system and method of desalination according to this disclosure may or may not comprise each of the sensors S shown in the figures, and may comprise additional sensors not mentioned herein. Such will be apparent to those of skill in the art. For example, the sensors S4 and S5 on the NF concentrate and RO concentrate lines 7 and 8, respectively, may be omitted. The sensor S6 on the optional clay stabilizer concentrate feed line 26 may also be omitted if the concentration of the additive in the concentrate tank has previously been measured and remains stable over time (in which case, the measured concentration of additive in the concentrate may be inputted into the control unit 52). It is also envisaged that the sensors S11, S2, and S3 on the optional SW by-pass line 17, on the RO permeate line 9, and on the NF permeate feed line 13, respectively, may be omitted when the compositions of the SW, RO permeate and NF permeate are predicted to remain substantially constant over time.

Figure 4:
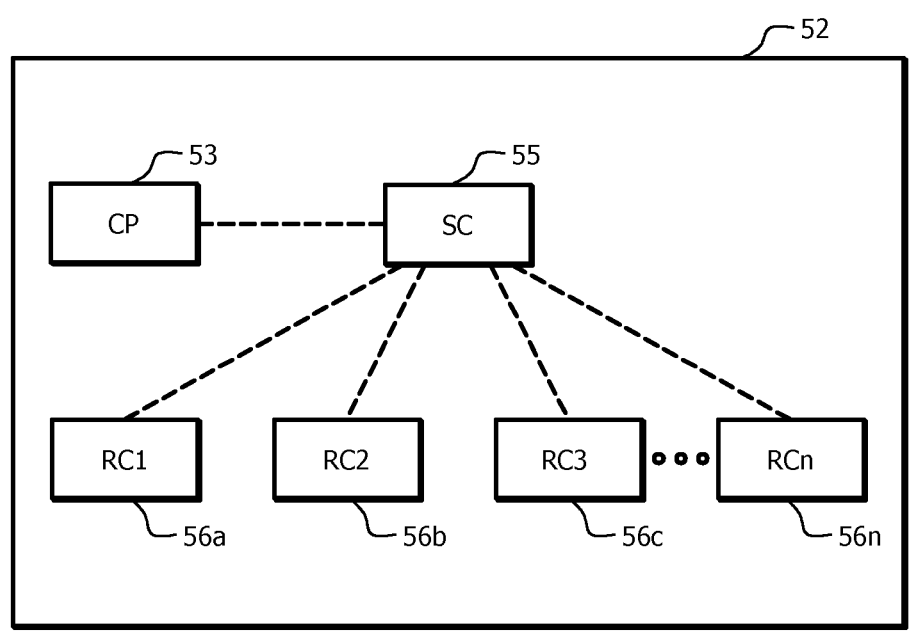
FIG. 4 is a schematic of a control system, according to an embodiment of this disclosure.

According to an embodiment of this disclosure, control system 52 comprises a central control software. In embodiments, there is a central computerized control system 52 for the desalination facility. As indicated in FIG. 4, which is a schematic of a control system 52, in embodiments, control system 52 comprises a control panel (CP) 53, a supervisory controller (or advanced controller) 55 that manages one or more regulatory controllers 56 (e.g., first regulatory controller RC1 (56A), second regulatory controller RC2 (56B), third regulatory controller RC3 (56C) . . . nth regulatory controller RCn (56n)) in real time. Computerized control system 52 can comprise one or a plurality of supervisory controllers 55. For example, in embodiments, another level of control is provided whereby a plurality of supervisory controllers 55, for example, communicate with a smaller number of (e.g., a single) master controllers. For example, a different controller may control operation of RO to produce a desired RO water, NF to produce a desired NF water, blending to produce a desired blended water (e.g., a desired RO/NF water, optionally in combination with SW, PW, and/or ion concentrate), etc. The control system 52 can, in embodiments, incorporate the capability of advanced control logic. For example, the control system 52 can include a digital model of the plant from which a supervisory controller 55 can make predictions regarding the effect of an action and/or regulate an event in real time. In embodiments, the SC 55 has reference to a model of the process running in real time that allows the SC 55 to make changes to prevent excursion of parameters occurring and/or to minimize the duration of an excursion by one or more controlled determinands.

The regulatory controller(s) 56 can control a single operation such as opening and closing valves during operation of the various modules (UF modules, RO modules and NF modules) and during cleaning cycles thereof. The regulatory controller(s) 56 can maintain various sensor readings at or within a predetermined range of a setpoint value. The supervisory controller 55 can provide data and setpoints to the regulatory controller(s) 56 in addition to providing permission for the regulatory controller(s) 56 to operate. For example, the supervisory controller 55 can instruct the regulatory controller(s) 56 when to open and close valves and the speed at which the valves open and close. The supervisory controller(s) 55 can intercede, for example, if the supervisory controller(s) 55 determines that the pressure in a line or the flow rate therein does not match set limits. This can apply to a single regulator controller or across a plurality of regulator controllers. For example, the supervisory controller(s) 55 can intercede when the pressure in an upstream line is above or below a threshold or setpoint value and shut down upstream and/or downstream units (e.g., by not allowing operation of one or more regulator controllers). The central control system 52 can thus optimize the performance of the desalination plant I, II during on-line operation of the various modules. In embodiments, the central control system 52 also controls the composition of the blended RO permeate/NF permeate stream (within pre-set limits), as described herein, and coordinates produced water (PW) blending and/or blending of SW, a clay stabilizer concentrate, or both into this blended RO permeate/NF permeate stream (within pre-set limits).

Computerized control system 52 can thus comprise a plurality of regulatory controllers 56. A regulatory controller 56 may be associated with each module, for example, a regulatory controller 56 may be configured to control operation of each RO array, each NF array, etc. For example, a regulatory controller could control the operation of a pump, such as high pressure feed pump 3. Such a regulatory controller can, for example, receive upstream and downstream pressure readings (as well as other inputs such as temperature, threshold inputs, etc.). The regulatory controller 56 may then either control a pressure valve and/or the speed of the pump to control the pressure change across the pump or the ultimate pressure downstream of the pump. In embodiments, each major process of the desalination system I, II (e.g., UF, RO, NF, blending, injection) has its own regulator or supervisory controller.

A given regulatory controller 56 can be associated with a specific unit of the desalination system I, II and control the operation of that unit. Each regulatory controller can operate as an I/O device, receiving inputs and providing outputs. Each regulatory controller thus receives inputs from one or more sensors (e.g., from sensors S1-S14 configured to provide temperature, pressure, and/or composition values for the various process streams, and/or flow rate sensors Q1-Q17 configured to provide flow rate values for the various process streams) and from supervisory controller 55. In response to the received inputs, each regulatory controller 56 is operable to provide an output in response to the input(s). For example, the RC(s) 56 may be operable to effect the positioning of valve(s) into open, closed or partially opened positions, instruct pump(s) to operate or cease operating, or a combination thereof. Thus, each RC 56 may be connected via direct electrical connection or wireless electrical connection (e.g., Wi-Fi, Bluetooth) with an associated unit(s), e.g., a pump and/or valve.

As noted above with reference to the embodiments of FIGS. 1-3, a variety of sensors (e.g., analog sensors) may be located within the UF and RO/NF sections, and communicate with one or more regulatory controllers 56, which in turn communicate with a supervisory controller(s) 55. For example, RO sensors may include, without limitation, one or more sensors configured to measure and/or enable calculation (e.g., by a regulatory controller 56) of feed pressure to an RO array (e.g., to RO array 4 or first RO array 4A), rate of change of feed pressure to an RO array (e.g., to RO array 4, first RO array 4A, and/or second RO array 4B), feed flow rate to an RO array (e.g., to RO array 4, first RO array 4A, and/or second RO array 4B), pressure of concentrate from an RO array (e.g., from RO array 4, first RO array 4A, and/or second RO array 4B), permeate pressure of an RO array permeate (e.g., from RO array 4, first RO array 4A, and/or second RO array 4B), differential pressure across an RO array (e.g., across RO array 4, first RO array 4A, and/or second RO array 4B), permeate conductivity for an RO array (e.g., RO array 4, first RO array 4A, and/or second RO array 4B), TDS of permeate from an RO array (e.g., from RO array 4, first RO array 4A, and/or second RO array 4B), pressure of concentrate from an RO array (e.g., from RO array 4, first RO array 4A, and/or second RO array 4B), temperature of permeate from an RO array (e.g., from RO array 4, first RO array 4A, second RO array 4B, combined RO permeate, e.g., in line 14), recovery of an RO array (e.g., calculated as the difference between the feed flow rate to and the concentrate flow rate from the RO array as a fraction of the feed flow rate to the RO array), or a combination thereof. For example, as indicated in the embodiment of FIG. 1, one or more sensors S1 may be configured to measure and/or enable calculation (e.g., by an RC 56) of feed pressure to an RO array (e.g., RO array 4), the rate of change of feed pressure to RO array 4, or a combination thereof; one or more sensors S2 may be configured to measure and/or enable calculation (e.g., by an RC 56) of the pressure of the permeate from RO array 4, the conductivity of the permeate from RO array 4, the TDS of the permeate from RO array 4, the temperature of the permeate from RO array 4, or a combination thereof; one or more sensors S5 may be configured to measure and/or enable calculation (e.g., by an RC 56) of the pressure of the concentrate from RO array 4; one or more flow rate sensors Q14 may be configured to measure and/or enable calculation (e.g., by an RC 56) of the feed flow rate to RO array 4; one or more flow rate sensors Q1 may be configured to measure and/or enable calculation (e.g., by an RC 56) of the flow rate of the concentrate from RO array 4; one or more flow rate sensors Q4 may be configured to measure and/or enable calculation (e.g., by an RC 56) of the flow rate of RO permeate dump via RO permeate dump line 11 and RO permeate dump valve V4; one or more flow rate sensors Q6 may be configured to measure and/or enable calculation (e.g., by an RC 56) of the flow rate of RO permeate in RO permeate line 9; or a combination thereof.

In the embodiment of FIG. 2, one or more sensors S1 may be configured to measure and/or enable calculation (e.g., by an RC 56) of the feed pressure to first RO array 4A, the rate of change of feed pressure to first RO array 4A, or a combination thereof; one or more sensors S5 may be configured to measure and/or enable calculation (e.g., by a regulatory controller 56) of the pressure of the concentrate from first RO array 4A, the feed pressure to second RO array 4B, the rate of change of feed pressure to second RO array 4B, or a combination thereof; one or more sensors S2 may be configured to measure and/or enable calculation (e.g., by a regulatory controller 56) of the pressure of the permeate from first RO array 4A, the conductivity of the permeate from first RO array 4A, the TDS of the permeate from first RO array 4A, the temperature of the permeate from first RO array 4A, or a combination thereof; one or more sensors S9 may be configured to measure and/or enable calculation (e.g., by a regulatory controller 56) of the pressure of the permeate from second RO array 4B, the conductivity of the permeate from second RO array 4B, the TDS of the permeate from second RO array 4B, the temperature of the permeate from second RO array 4B, or a combination thereof; one or more flow rate sensors Q14 may be configured to measure and/or calculate the feed flow rate to first RO array 4A; one or more flow rate sensors Q12 may be configured to measure and/or enable calculation (e.g., by a regulatory controller 56) of the flow rate of the concentrate from second RO array 4B; one or more flow rate sensors Q4 may be configured to measure and/or enable calculation (e.g., by a regulatory controller 56) of the flow rate of RO permeate dump via RO permeate dump line 11 and RO permeate dump valve V4; one or more flow rate sensors Q6 may be configured to measure and/or enable calculation (e.g., by a regulatory controller 56) of the flow rate of RO permeate in combined RO permeate line 14; one or more flow rate sensors Q16 may be configured to measure and/or enable calculation (e.g., by a regulatory controller 56) of the flow rate of feed to second RO array 4B; or a combination thereof.

By way of non-limiting examples, for example, NF sensors (that may provide inputs to regulatory controller(s) 56) may include, without limitation, one or more sensors configured to measure and/or enable calculation (e.g., by a regulatory controller 56) of the feed pressure to an NF array, the permeate pressure from an NF array, conductivity of permeate from an NF array, the TDS of the permeate from an NF array, the pressure of concentrate from an NF array, the flow rate of concentrate from an NF array, the differential pressure across an NF array, the rate of change of feed pressure to an NF array, the recovery of an NF array (e.g., calculated as the difference between the feed flow rate to and the concentrate flow rate from the NF array as a fraction of the feed flow rate to the NF array), or a combination thereof.

For example, as indicated in the embodiment of FIGS. 1 and 2, one or more sensors S3 may be configured to measure and/or calculate the pressure of the permeate from NF array 5, the conductivity of the permeate from NF array 5, the TDS of the permeate from NF array 5, the temperature of the permeate from NF array 5, or a combination thereof; one or more sensors S4 may be configured to measure and/or enable calculation (e.g., by an RC 56) of the pressure of the concentrate from NF array 5; one or more sensors S10 may be configured to measure and/or enable calculation (e.g., by an RC 56) of the feed pressure to NF array 5, the rate of change of feed pressure to NF array 5, or a combination thereof; one or more flow rate sensors Q15 may be configured to measure and/or enable calculation (e.g., by an RC 56) of the feed flow rate to NF array 5; one or more flow rate sensors Q2 may be configured to measure and/or enable calculation (e.g., by an RC 56) of the flow rate of the concentrate from NF array 5; one or more flow rate sensors Q3 may be configured to measure and/or enable calculation (e.g., by a regulatory controller 56) of the flow rate of NF permeate dump via NF permeate dump line 10 and NF permeate dump valve V3; one or more flow rate sensors Q7 may be configured to measure and/or enable calculation (e.g., by a regulatory controller 56) of the flow rate of NF permeate in NF permeate line 13; or a combination thereof.

As indicated in FIG. 1, a sensor S6 may be configured to provide and/or enable calculation (e.g., by an RC 56) of composition, temperature, pressure or a combination thereof for concentrate flow in concentrate line 26 from concentrate tank 50, and a flow rate sensor Q8 may be configured to measure and/or enable calculation (e.g., by an RC 56) of the flow rate in concentrate line 26 from concentrate pump 25. One or more sensors S7 may be configured to measure and/or enable calculation (e.g., by an RC 56) of the temperature, pressure, and/or composition of the low salinity injection water stream in low salinity EOR water line 18, and a flow rate sensor Q10 may be configured to measure and/or enable calculation (e.g., by an RC 56) of the flow rate therein. When desalination system I, II provides low salinity blended EOR water comprising RO/NF (e.g., RO and/or NF water) water in combination with sea water (SW) and/or produced water (PW), one or more sensors S11 may be configured to measure and/or enable calculation (e.g., by an RC 56) of the temperature, pressure, and/or composition of sea water in SW bypass line 17, a flow rate sensor Q5 may be configured to measure and/or enable calculation (e.g., by an RC 56) of the flow rate of sea water in SW bypass line 17, one or more sensors S8 may be configured to measure and/or enable calculation (e.g., by an RC 56) of the temperature, pressure, and/or composition of produced water in PW line 17a, a flow rate sensor Q11 may be configured to measure and/or enable calculation (e.g., by an RC 56) of the flow rate of produced water in PW line 17a, or a combination thereof.

By way of example, UF sensors (that provide inputs to RC(s) 56) may include, without limitation, one or more sensors configured to measure and/or enable calculation (e.g., by an RC 56) of the feed pressure to UF, the feed flow to UF, the header backwash pressure to UF, the filtrate pressure from UF, the UF differential pressure, the rate of change of UF transmembrane pressure, or a combination thereof. For example, as indicated in the embodiment of FIG. 3, one or more sensors S12 may be configured to measure and/or enable calculation (e.g., by an RC 56) of the temperature in UF feed line(s) 34; one or more sensors S13 may be configured to measure and/or enable calculation (e.g., by an RC 56) of the pressure in UF feed line(s) 34; one or more sensors S14 may be configured to measure and/or enable calculation (e.g., by an RC 56) of the pressure in UF filtrate line(s) 41; one or more flow rate sensors Q17 may be configured to measure and/or enable calculation (e.g., by an RC 56) of the flow rate in UF feed line(s) 34; or a combination thereof.

In response to inputs from the sensors (S, Q) and/or the SC 55, RCs 56 may be operable to position one or more valves into open, closed, or partially open positions. For example, one or more RO/NF or blending valves may be configured to control the flow rate of the RO feed, the RO permeate, the NF permeate, the RO concentrate, the NF concentrate, the PW blended into the low salinity FOR water, the SW blended into the low salinity FOR water, the concentrate blended into the low salinity FOR water, the RO permeate water dumped, the NF permeate water dumped, or a combination thereof. For example, in the embodiment of FIGS. 1 and 2, one or more valves V9 may control the flow of high pressure high salinity water in line 2; one or more valves V1 may control the flow of RO concentrate in RO concentrate line 8/8A; one or more valves V2 may control the flow of NF concentrate in NF concentrate line 7; one or more valves V3 may control the flow of NF permeate in NF permeate dump line 10; one or more valves V4 may control the flow of RO permeate in RO permeate dump line 11; one or more valves V5 may control the flow of SW in SW bypass line 17; one or more valves V6 may control the flow of PW in PW blend line 17a; one or more valves V7 may control the flow and/or pressure of feed water to NF 5; one or more valves V8 may control the flow of RO concentrate from second RO array 4B; one or more valves V10 may control the flow of PW in a PW blending line 17a; or a combination thereof.

For example, one or more UF valves may be configured to control the flow rate of the UF feed, the flow rate around heat exchanger 32, the UF backwash, or a combination thereof. For example, in the embodiment of FIG. 3, one or more valves V11 may be configured to control bypass around heat exchanger 32; one or more valves V12 may be configured for the control of flow into each UF skid 40A/40B/40C/40D/40E/40F/40G/40H; one or more valves V13 may be configured to control the flow of backwash (BW) into each UF skid; or a combination thereof.

The RCs 56 may also provide, to the SC 55, an output indicating a 'state' or 'mode' of the associated unit. For example, UF modes may include options such as UF maintenance, UF off, UF standby, UF operation, UF backwash, UF chlorine enhanced backwash (CEB), UF cleaning (e.g., chemical clean-in-place or CIP), UF draining (e.g., draining a UF skid), UF filling (e.g., filling a UF skid with water), UF integrity test (e.g., testing the condition of membrane fibers), UF preservation/winterization (e.g., adding preservation chemicals), UF preserved (e.g., membranes in preserved condition), UF exit preservation (e.g., rinsing out preservation chemicals), and the like. Similarly, RO/NF states or modes may include RO/NF maintenance, RO/NF off, RO/NF standby, RO/NF operation, RO/NF online biocide, RO/NF flushing, RO/NF array cleaning with CIP (e.g., first RO Array CIP, second RO array CIP, NF array CIP, etc.), RO/NF preservation/winterization (e.g., first RO array preservation/winterization, second RO array preservation/winterization, and/or NF array preservation/winterization), RO/NF preserved (e.g., first RO array preserved/winterized, second RO array preserved/winterized, NF array preserved/winterized, etc.), RO/NF exit preservation (e.g., first RO array exit preservation/winterization, second RO array exit preservation/winterization, NF array exit preservation/winterization), and the like. The modes may indicate to the SC 55 whether or not the associated unit is healthy.

In general, the low salinity generation system is driven off of pressure. For example, for the RO and NF skids that generate a blended low salinity RO/NF injection water, there is typically about 50 percent recovery of permeate fluids, with the remainder being retentate; as the temperature of the system decreases, the pressure requirements go up, and the recovery (i.e., the amount of permeate) decreases. Via the computerized control system and method of this disclosure, control unit 52 can control the desalination system within the vessel pressure limits while, in embodiments, seeking to obtain and maintain the necessary flow of low salinity water within a desired concentration envelope. By way of non-limiting examples, in embodiments, the SC 55 operates via the RCs to maintain the pressure of feed to the first RO array 4A in the range of from about 0 to about 80 barg, a differential pressure across first RO array 4A in the range of from about 0 to about 5 barg, a pressure in the first RO permeate in the range of from about 0 to about 16 barg, a rate of change of feed pressure to first RO array 4A in the range of from about 0 to about 5 barg/s, a first RO array concentrate pressure in the range of from about 0 to about 80 barg, a first RO array permeate conductivity in the range of from about 50 to about 500 µs/cm, a pressure of the feed to the second RO array 4B in the range of from about 0 to about 80 barg, a differential pressure across second RO array 4B in the range of from about 0 to about 5 barg, a pressure in the second RO permeate in the range of from about 0 to about 16 barg, a rate of change of feed pressure to second RO array 4B in the range of from about 0 to about 5 barg/s, a second RO array permeate conductivity in the range of from about 50 to about 500 µs/cm, an RO permeate TDS content in the range of from about 50 to about 4,000 ppm, a pressure of the feed to the NF array 5 in the range of from about 0 to about 50 barg, a differential pressure across NF array 5 in the range of from about 0 to about 5 barg, a pressure in the NF permeate in the range of from about 0 to about 16 barg, a rate of change of feed pressure to NF array in the range of from about 0 to about 5 barg/s, an NF concentrate pressure in the range of from about 0 to about 50 barg, an NF permeate conductivity in the range of from about 50,000 to about 120,000 µs/cm, an NF permeate TDS content in the range of from about 20,000 to about 60,000 ppm, a feed flow rate to the first RO array 4A in the range of from about 0 to about 800 $m^3/h$, a feed flow rate to second RO array 4B in the range of from about 0 to about 600 $m^3/h$, a concentrate (or 'retentate') flow rate from second RO array 4B in the range of from about 0 to about 600 $m^3/h$, a feed flow rate to the NF array 5 in the range of from about 0 to about 100 $m^3/h$, a concentrate (or 'retentate') flow rate from NF array 5 in the range of from about 0 to about 50 $m^3/h$, an RO and/or NF array permeate temperature in the range of from about 0 to about 40° C., a first RO array, second RO array, and/or NF array recovery in the range of from 10 to 35% by volume, or a combination thereof. In embodiments, the RO membrane units are operated with a pressure differential across the membrane that provides a recovery of RO permeate in the range of from 35 to 75% by volume, from 35 to 65% by volume, from 35 to 60% by volume, from 45 to 55% by volume, or from 50 to 55% by volume, based on the volume of the RO feed water.

The supervisory controller (SC) 55 is in signal communication with each regulator controller (RC) 56 and may be aware of the impact of a change via the digital model. In embodiments, the SC 55 cross checks various thresholds and parameters and can either reset thresholds of individual RCs 56 or simply override their commands to achieve a greater, process-wide objective. In embodiments, the SC 55 may monitor trends in values from the RC(s) 56, and predict future operation (and provide permissions to the RC(s) 56) based on the monitored trends. In such embodiments, the RCs 56 send readings (e.g., both inputs from the sensors and outputs, such as calculated values (e.g., a rate of change of feed pressure, recovery, etc.)) back to the SC 55. In embodiments, the SC 55 is permissive in that it sends permission back to each RC 56 to allow it to operate. In such embodiments, the RC 56 is either given permission to control the process or instructed to shut down. Other control schemes are also possible (e.g., simply changing set points or thresholds to achieve a goal), and within the scope of this disclosure.

Supervisory controller(s) 55 are operable to ensure that the change to the operation of the desalination plant I, II is made in a safe manner whilst monitoring the consequences of the change. For example, as previously noted, the supervisory controller 55 may monitor rates of change of pressure or rates of change of flow in lines. The supervisory controller 55 may also take into account time delays from taking an action to the action taking effect (e.g., such delays arising from dead volumes inherent in the design of the desalination plant) and may, for example, instruct the regulatory controller(s) 56 to open outlet valves from (or close inlet valves to) a module slightly ahead of opening inlet valves thereto (or closing outlet valves therefrom). The supervisory controller (s) 55 may be operable to ensure that changes in the state of valves, etc., do not compromise the safe operation of the desalination plant I, II.

In embodiments, the computerized control system further comprises a control panel (CP) 53 that accepts inputs and commands from a user, displays various information, and sends inputs, thresholds, targets, etc. down to the SC 55. The SC 55 then determines permissions and sends those to each RC 56. The return path is analogous in that each RC 56 sends its readings (e.g., values from sensors S, Q and/or calculations therefrom) and/or 'state' back to the SC 55, which may then display these on the CP 53.

The SC 55 can respond to changes in conditions. For example, the SC 55 can control based on a logic table (e.g., a lookup table), equations, control schemes or digital modelling, or can cycle through options that may require some user input via control panel 53. The SC 55 can thus be used to partially or fully automate the desalination process (e.g., production of RO water, production of NF water, blending of RO permeate, NF permeate, SW. PW, ion concentrate, etc.), in embodiments. In embodiments, the CP 53 has an interface that allows an operator or user to co-control the sequence of actions in the process through the SC 55 controlling the RCs 56. In this case, the permissions can simply control the order of actions by controlling the ability for various processes to operate until they are needed. For example, valves associated with a cleaning cycle for the RO or NF units can be shut down by the SC 55 until a cleaning cycle is required for these units. At that time, a portion of the NF or RO units can be isolated and the cleaning cycle can be initiated in response to the SC 55 allowing the RC(s) 56 associated with the cleaning cycle to operate. Other process specific controllers can be similarly operated by using a permission based control scheme from the SC(s) 55.

In embodiments, control panel 53 comprises soft buttons on a screen display (e.g., touch screen, or via a mouse or other input) and a display whereby a plethora of aspects of the low salinity injection system I, II can be displayed and/or controlled. For example, permitted requests may be inputted to the control panel 53 to make a change to the operation of the desalination plant, e.g., close a valve, operate a pump or change a blend ratio. The request is then passed to the supervisory controller(s) 55.

The herein-disclosed computerized control system can also be operable for cleaning routines for the RO and/or NF arrays. For cleaning of the RO or NF filters or membranes, the RCs 56 may be utilize to monitor trend lines of various operating parameters, which can be used by the SC 55 via reference, for example, to an enhanced performance monitoring module to determine which foulants are present and a suitable cleaning routine and/or schedule, for example, as described in International Patent Application No. PCT/EP2017/067443 and published as WO/2018/015223, the disclosure of which is hereby incorporated herein by reference in its entirety for purposes not contrary to this disclosure.

In embodiments, the SC 55 operates and acts on data from the RCs 56 and/or the CP 53 by setting permissions for the RCs 56, while the RCs 56 have a state dependent operation, only acting on the inputs they receive from sensors (e.g., one or more of sensors S1-S14 and Q1-Q17, or other sensors) when allowed or 'permitted' by the SC 55.

In embodiments, the SC 55 and RCs 56 can be implemented using similar hardware configurations. For example, the SC 55 and RCs 56 can be implemented using dedicated controller modules that can include computerized or special purpose controller modules. In other embodiments, the SC 55 and/or the RCs 56 can be implemented in software using controller software stored in a memory and executed on a processor. A specific control module (e.g., which can be implemented as a software module stored in a memory and executed on a processor) may be associated with each RC 56 to configure the RC 56 for its associated unit. For example, a pump control module may be associated with an RC 56 associated with feed pump 3, a valve control module may be associated with an RC 56 associated with SW bypass valve V5, etc. Each control module can be installed on the RC hardware, which may be otherwise similar. The control module can accommodate any arrangement of RO/NF arrays or skids for TDS management during production of low salinity water via blending of RO permeate with NF permeate, SW and/or PW addition. For example, the control module may be operable to isolate NF sections of the skids or operate the skids with NF elements replaced with RO elements, in embodiments.

In some embodiments, the controllers (e.g., the SC 55 and/or the RCs 56) can be implemented at or near the unit being controlled. In other embodiments, the controllers (both SC 55 and RC(s) 56) can be installed in a mainframe that is in signal communication with the units and the sensors associated with the various units. Each controller may be a separate blade in a server stack, or each controller may be a virtual controller with its own inputs and outputs (e.g., with multiple controllers operating on a single server blade). Alternatively, a regulatory controller 56 could be a separate computer unit positioned closer to the unit with which it is associated. In either arrangement, inputs to and outputs from each RC 56 can be sent up a level to the SC 55.

Control system 52 of the present disclosure may include a CPU (Central Processing Unit), a RAM (Random Access Memory), a ROM (Read Only Memory), a HDD (Hard Disk Drive), I/F (Interfaces), computer-executable code (e.g., software and/or firmware), and the like. The control unit 52 can store instructions in the memory, where the instructions can be executed on the processor to configure the processor to perform any of the functions or actions described with respect to or attributed to the control system according to the instructions stored in the memory. While described as including a processor and memory, in some aspects, an application specific integrated circuit (ASIC) can be developed to perform the same functions.

In embodiments, the herein-disclosed computerized control system and method can be utilized for producing, a first blended low salinity injection water for injection into at least one injection well that penetrates a first region of an oil-bearing reservoir and a second blended low salinity injection water for injection into at least one injection well that penetrates a second region of an oil-bearing reservoir, wherein the reservoir rock of the first and second regions has first and second rock compositions respectively that present different risks of formation damage and wherein the first and second blended low salinity injection waters comprise variable amounts of nanofiltration permeate, reverse osmosis permeate and optionally varying amounts of seawater and/or clay stabilizing additive and wherein the compositions of the first and second blended low salinity injection waters are maintained within first and second predetermined operating envelopes respectively that balance improving or maximizing enhanced oil recovery from the first and second regions of the reservoir while reducing or minimizing formation damage upon injecting the first and second blended low salinity injection waters from the injection well(s) into the first and second regions of the oil-bearing reservoir.

A system for injecting a single blended low salinity injection water of variable composition into at least one injection well penetrating a region of an oil-bearing reservoir may thus comprise a control unit, a desalination plant, a blending system and an injection system. The desalination plant can comprise an RO array for producing an RO permeate blending stream and for delivering the RO permeate blending stream to the blending system and an NF array for producing an NF permeate blending stream and for delivering the NF permeate blending stream to the blending system. The blending system can comprises an RO permeate feed line (e.g., (first) RO permeate line 9, second stage RO permeate line 27, combined RO permeate line 14), an NF permeate feed line (e.g., NF permeate line 13), an RO permeate dump line (e.g., RO permeate dump line 11), an NF permeate dump line (e.g., NF permeate dump line 10), a blending point for blending the RO permeate and NF permeate to form the blended low salinity injection water and a discharge line (e.g., blended low salinity injection water line 18) for delivering the blended low salinity injection water to the injection system. The injection system can comprise an injection line (e.g., injection line 58) having at least one injection pump (e.g., injection pump 24) for delivering the blended injection water to: the injection well(s) (e.g., injection well 20) penetrating the region 22 of the oil-bearing reservoir. The control unit of the desalination plant may be a control unit 52 comprising an SC 55 and RC(s) 56, operable to adjust the operation of the desalination plant, in real time, to adjust the amounts of RO permeate and/or NF permeate blending streams that are to be blended at the blending point thereby maintaining the composition of the blended low salinity water stream within an operating envelope defined by boundary values for the region, wherein the predetermined operating envelope balances improving or maximizing oil recovery from the region(s) of the reservoir while reducing or minimizing formation damage in the region(s) of the reservoir and wherein the predetermined operating windows have been inputted into the control unit.

In embodiments, the blending system that produces the blended low salinity water comprises a tank (e.g., tank 50) for a concentrated aqueous solution of at least one clay stabilizing additive (hereinafter "clay stabilizing concentrate") and a clay stabilizing concentrate feed line (e.g., ion concentrate line 26) provided with an adjustable flow control valve (e.g., valve V10) that is capable of delivering different amounts of the clay stabilizing concentrate to the blended low salinity injection water. Alternatively, the tank may be provided with a metering pump to accurately dose the clay stabilizing concentrate into the injection water. The metering pump may be linked to a flow rate meter that may be used to adjust the concentration of the clay stabilizing additive to match the concentration profile for the clay stabilizing additive(s). The control unit 52 of the system may change the operation of the blending system, in real time, to adjust the amount of the clay stabilizing concentrate delivered to: the blending point of the blending system or to the injection line thereby maintaining the composition of the resulting blended low salinity water (e.g., in injection water line 18) within the operating envelope that is further defined by boundary values for the concentration of the clay stabilizing additive for the region(s) of the reservoir. Thus, the predetermined operating envelope(s) for the region(s) of the reservoir include upper and lower limits for the concentration of one or more clay stabilizing additives.

It is envisaged that the computerized control system or method of this disclosure may be located or utilized onshore for use with an onshore reservoir or offshore (e.g., on a platform or floating production storage and offloading (FPSO) unit) for use with an offshore reservoir. However, where the computerized control system is for use with an offshore reservoir, it is also envisaged that the desalination plant may be located onshore and the RO permeate and NF permeate streams may be delivered to a blending system located offshore.

Boundary values for the compositions of the blended low salinity injection waters for each region of an oil reservoir may be inputted into the control system 52, for example into SC(s) 55. The SC(s) may then determine operating envelopes for the composition of the blended low salinity injection water for each region of the reservoir where the operating envelopes are defined by the boundary values. However, it is also envisaged that the operating envelopes may be determined by inputting the boundary values into a computer situated at a remote location, outputting the operating envelopes and transmitting the outputted operating envelopes to the control unit 52 of the system via a network. The operating envelopes may be defined by boundary values (upper and lower limits) for parameters including one or more of: the TDS content (salinity), ionic strength, the concentrations of individual ions (such as sulfate anions, nitrate anions, calcium cations or magnesium cations), the concentrations of types of individual ions (such as monovalent cations, monovalent anions, multivalent anions, multivalent cations, or divalent cations) ratios of types of individual ions, ratios of individual ions (such as Sodium Adsorption Ratio), or any combination thereof. Sodium Adsorption Ratio (SAR) is used to assess the state of flocculation or of dispersion of clays in the reservoir rock. Typically, sodium cations facilitate dispersion of clay particles while calcium and magnesium cations promote their flocculation. A formula for calculating the Sodium Adsorption Ratio (SAR) is:

$$SAR = \frac{[Na+]}{\sqrt{(0.5[Ca2+] + [Mg2+])}}$$

wherein sodium, calcium, and magnesium cation concentrations of a blended low salinity injection water are expressed in milliequivalents/liter.

Compositions within the operating envelope for a region of the reservoir are those predicted to achieve enhanced oil recovery (EOR) from each region of the reservoir while avoiding, reducing, or minimizing the risk of formation damage in the region of the reservoir.

Where there is a souring risk or scaling risk for the reservoir, compositions within the operating envelope for a region (e.g., first, second and any further region(s)) of the reservoir are those that are also predicted to mitigate reservoir souring or inhibit scaling. The person skilled in the art will understand that not all reservoirs present a souring risk or a scaling risk. Thus, souring may occur when a reservoir contains an indigenous population of sulfate reducing bacteria that obtain energy by oxidizing organic compounds while reducing sulfate to hydrogen sulfide. Scaling may occur when a connate water containing high levels of precipitate precursor cations such as barium and strontium cations mixes with an injection water containing relatively high amounts of sulfate anions resulting in the precipitation of insoluble sulfate salts (mineral scales).

It is envisaged that each region of the reservoir may have a plurality of different operating envelopes defined by different boundary values for each parameter where the different operating envelopes balance different levels of enhanced oil recovery (EOR) with different levels of risk of formation damage for each region of the reservoir. The plurality of operating envelopes for each region of the reservoir may also take into account the risk of souring or scaling of the reservoir. The plurality of different operating envelopes for the composition of the blended low salinity injection water for each region (first, second and any further region(s)) of the reservoir may be inputted into the control unit 52.

In order to maintain the compositions of the blended low salinity water within the predetermined (predefined) operating window for the regions of the reservoir, the amounts of NF permeate, RO permeate, PW, SW, or a combination thereof that are blended to produce the blended low salinity water stream(s) may be adjusted in real time, via the herein-disclosed computerized control system, in response to a decrease in injectivity in one or more of the regions of the reservoir.

In the blending system of this disclosure, the amount of the NF permeate stream (e.g., NF permeate in NF permeate line 14) and/or of the RO permeate (e.g., RO permeate in (first) RO array permeate line 9, RO permeate in second RO array permeate line 27, or combined RO permeate in combined RO permeate line 14) available for blending to form the blended low salinity injection water stream(s) may be rapidly adjusted (in real time) by discharging varying amounts of the NF permeate stream or RO permeate stream from the desalination plant, for example, into a body of water (the ocean), via an NF permeate or RO permeate "dump line" (e.g., RO permeate dump line 11, NF permeate dump line 10) respectively that are each provided with a "dump valve" (e.g., RO permeate dump valve V4, NF permeate dump valve V3). The dump valve is an adjustable valve (e.g., a throttle valve) that may be set to various positions (between a fully closed and fully open position) to adjust the amounts of NF permeate or RO permeate discharged from the blending system.

If the discharge of excess NF permeate or excess RO permeate continues for a prolonged period of time, for example, hours or days, then the control unit 52 may make adjustments to the desalination plant by taking one or more of the NF units of the array or one or more of the RO units of the RO array off-line thereby reducing the production capacity of NF permeate or RO permeate respectively. If, the discharge of excess NF permeate or RO permeate continues for weeks or months, optionally, the NF elements of one or more of the NF units of the desalination plant may be replaced by RO elements or the RO elements of one or more of the RO units may be replaced by NF elements to increase the amounts of RO permeate or of NF permeate produced by the desalination plant.

It is known that divalent cations may be beneficial for stabilizing clays. Optionally, the desalination plant may have a by-pass line (e.g., bypass line 17) for the high salinity water used as feed to the RO and NF arrays of the plant and/or an inlet line for PW (e.g., PW blending line 17a), as this high salinity feed water or PW, for example, seawater (SW) typically contains high levels of divalent cations. This by-pass line or PW line can be used for delivering a high salinity water blending stream (for example, a SW or PW blending stream) to the blending system. Accordingly, the blending system optionally has a high salinity water (e.g., PW, SW) feed line.

The by-pass line 17 for the high salinity feed water and/or the PW inlet line 17a may be provided with an adjustable valve (e.g., a throttle valve V5 or V6, respectively) that may be set to various positions between a fully closed and fully open position thereby providing variable amounts of high salinity feed water (e.g., SW) or PW for blending with the RO permeate blending stream 9, and/or NF permeate blending stream 13 (or a combined RO/NF permeate blending stream 14) to form the blended low salinity injection water(s) 18. However, if desired, any excess high salinity water may also be dumped overboard via a high salinity water dump line provided with an adjustable valve (e.g., a throttle valve). The use of an adjustable valve on the optional SW by-pass line (or of a SW dump line provided with an adjustable valve) and/or the optional PW blending line also allows for rapid adjustments (in real time) to the TDS, concentration of one or more individual ions to the composition(s) of the blended low salinity injection water stream(s), in embodiments.

The control unit 52 may therefore alter the amount of any high salinity water (e.g., NF permeate and/or SW and/or PW) included in the blended low salinity injection water stream(s) in response to changes in injectivity in one or more of the regions of the reservoir to move the composition(s) of the blended low salinity water stream(s) to within preferred predetermined (preselected) operating envelope(s) (or a preferred overriding envelope) where there is less risk of formation damage. The person skilled in the art will understand that SW contains high level of sulfate anions. Accordingly, when blending an RO permeate blending stream, and an NF permeate blending stream with a SW blending stream, the souring risk (and scaling risk) for the reservoir must be rigorously managed. The souring risk or scaling risk for a reservoir may be managed by inputting into the control unit 52 (e.g., to SC 55 thereof) an upper limit (boundary value) for the sulfate concentration of the blended low salinity injection water(s) of typically 40 mg/L; for example, 25 mg/L or 10 mg/L.

As previously noted, the blending system may optionally comprise a tank 50 (for storing a concentrate comprising an aqueous solution or dispersion of one or more clay stabilizing additives) and a concentrate feed line 26. The concentrate feed line may be provided with a throttle valve (e.g., valve V10) for delivering variable amounts of a concentrate blending stream comprising the aqueous solution or dispersion of one or more clay stabilizing additives to a blending point for the low salinity injection water stream. Thus, the adjustable valve may be set (e.g., via or more RCs 56) to various positions between a fully closed and fully open position thereby providing variable amounts of concentrate for to the blending point. The control unit 52 (e.g., SC 55 thereof) may monitor (e.g., via flow rate sensor Q8 and one or more RCs 56) the flow rate of the concentrate in the concentrate feed line 26 in real time and may make rapid adjustments to the flow rates of the concentrate using the adjustable valve(s) thereby changing the concentration of the one or more clay stabilizing additives in the blended injection water stream(s).

The clay stabilizing additive(s) may be an inorganic salt such as a salt of a divalent cation or a potassium salt, or a mixture/combination thereof. In embodiments, the salt of the divalent cation may be a calcium salt such as calcium chloride, calcium bromide, calcium nitrite, or calcium nitrate, for example, calcium chloride or calcium nitrate.

Calcium nitrate also has the advantage of providing souring control as the nitrate anion may encourage the growth of nitrate reducing (NR) bacteria that may out-compete sulfate reducing bacteria (SRB) for nutrients and assimilable organic carbon. In such embodiments, care may be exercised to ensure that facultative NRSRB are not present before nitrate salts are added. In embodiments, the potassium salt is selected from potassium chloride, potassium bromide and potassium nitrate. Potassium nitrate has the advantage that it may also provide souring control.

The control unit 52 (e.g., SC 55 thereof) may automatically adjust (e.g., via RCs 56 and appropriate valves V) the operation of the blending system and, hence, the amounts of the RO permeate stream, NF permeate stream (and of any optional high salinity water stream such as SW or PW or optional clay stabilizer concentrate stream) that are included in the blended low salinity injection water stream(s) in response to changes in injectivity in one or more of the regions of the reservoir.

The flow rate and composition of the blended low salinity injection water may be monitored (e.g., via flow rate sensors Q9 and/or Q10 and/or sensor S7, and associated RC(s) 56) in real time to determine whether changes made by the control unit 52 to the operation of the blending system to maintain the composition of the single blended low salinity injection water within the operating envelope are effective. If not, SC 55 of the control unit 52 may make further changes to the operation of the blending system (via RCs 56 and associated pumps and/or valves). Accordingly, the control unit has a feedback loop for controlling blending of the blended low salinity water stream(s).

Controlling the amounts of RO permeate and NF permeate that are available for blending in real time by changing the amounts of RO permeate or NF permeate discharged from the blending system via an RO permeate or NF permeate dump line, for example, into a body of water (e.g., the ocean), provides a robust control of TDS and/or of the concentrations of the one or more individual ions within the operating envelope(s) for the blended low salinity injection water stream(s). Thus, there is a faster response than if an attempt was made to change the flow rates of feed water to the RO and NF arrays of the desalination plant (owing to the dead volumes in the feed lines leading from the RO and NF arrays to the blending point(s) for the blended low salinity injection water stream(s)).

Further, where a high salinity water (e.g., SW and/or PW) or a clay stabilizing concentrate is available as a blending stream, controlling the degree of opening of the adjustable (variable) valves (e.g., throttle valves) on the high salinity water by-pass line, the PW inlet line, or on the clay stabilizing concentrate line may adjust the composition of the single blended low salinity injection water to fall within a predetermined operating envelope in response to changes in injectivity in the injection well(s) penetrating the region(s) of the reservoir.

It can therefore be seen that the SC 55 of control unit 52 may alter the operation of the desalination plant in real time by adjusting, via one or more RCs 56, one of more of the opening degree of the valve V4 on the RO permeate dump line 11, the opening degree of the valve V3 on the NF permeate dump line 10, the opening degree of the valve V5 on the optional high salinity water by-pass line 17, the opening degree of the valve V6 on the optional PW inlet line 17a, and/or the opening degree of the valve V10 on the optional clay stabilizing concentrate line 26.

As noted hereinabove, various probes (sensors S, Q) may be included in the system of the present invention, in particular, in the blending system. These probes may be used to determine the TDS and/or ionic composition of the blended low salinity injection water stream(s). For example, the TDS of the blended low salinity injection water stream(s) may be determined from its conductivity, while the concentrations of individual ions or types of individual ions may be determined using glass probes having membranes that are permeable to specific individual ions or types of individual ions. Similarly, probes (sensors) may be present on the RO and NF permeate lines, any combined RO/NF permeate line (where a combined RO/NF permeate stream is optionally blended with SW, PW, or clay stabilizing concentrate to form a blended low salinity injection water), the optional high salinity water by-pass line, and/or the optional PW inlet line, to obtain data relating to the TDS and ionic composition of the RO permeate stream, NF permeate stream, any combined RO/NF permeate stream, the optional high salinity water stream, the optional PW inlet blending stream, or a combination thereof. Flow rate sensors may also be provided on flow lines for determining the flow rates of the various blending streams (RO permeate stream(s), NF permeate stream(s), the optional high salinity feed water stream(s), the optional high salinity PW blending stream(s), any combined RO/NF permeate stream(s), and/or the optional clay stabilizing concentrate stream(s)) and for determining the flow rates of RO permeate in the RO permeate dump line and NF permeate in the NF permeate dump line.

Accordingly, in embodiments, the blending system comprises ion concentration sensors S for measuring the salinity or total concentration of dissolved solids (Ct), concentrations of individual ions (Ci) or types of individual ions in the RO permeate blending stream(s), NF permeate blending stream(s), any combined RO/NF permeate blending stream(s), optional SW blending stream(s), optional PW blending stream(s), optional clay stabilizing concentrate blending stream(s), and the blended low salinity injection water stream(s). In particular, the blending system may have ion concentration sensors for measuring at least one of TDS concentration, chloride anion concentration, bromide anion concentration, calcium cation concentration, magnesium cation concentration, potassium cation concentration, nitrate anion concentration and sulfate anion concentration for the RO permeate blending stream(s), NF permeate blending stream(s), any combined RO/NF permeate blending stream(s), optional high salinity water blending stream(s) and/or high salinity PW blending stream(s). The blending system may alternatively or additionally comprise flow rate sensors Q for measuring the flow rates of one or more of: the RO permeate blending stream(s), the RO permeate dump stream, the NF permeate blending stream(s), the NF permeate dump stream, any combined RO/NF permeate blending stream(s), the optional high salinity water by-pass stream(s), the optional PW blending stream(s), the optional clay stabilizing concentrate stream(s) and the blended low salinity injection water stream(s). As noted hereinabove, each of the sensors S and Q provide inputs/data to one or more RCs 56.

The ion concentration sensors, the flow rate sensors, and any other sensors described herein may communicate with the control unit 52 (e.g., with RCs 56 thereof) through any suitable communication technology, such as a direct electrical connection or wireless electrical connection (e.g., Wi-Fi, Bluetooth).

Owing to the risk of formation damage during a low salinity water flood, a maximum permitted increase in downhole pressure for the injection well(s) penetrating the region(s) of the reservoir may be inputted into the control unit 52 (e.g., into SC 55 via CP 53). Where dedicated injection line(s) are used for delivering injection waters to the injection well(s) penetrating the regions of the reservoir, a maximum permitted reduction in flow rate for each injection water stream downstream of the injection pump(s) on each dedicated flow line may be inputted into the control unit (beyond which there is an unacceptable reduction in injectivity). Both an increase in downhole pressure in an injection well penetrating one of the regions of the reservoir and a decrease in flow rate downstream of the injection pump(s) of the dedicated flow lines may be indicative of loss of injectivity arising from formation damage in one of the regions of the reservoir.

The downhole pressure in the injection well(s) adjacent the oil-bearing layer in each region of the reservoir (or the flow rate of the blended low salinity injection water downstream of the injection pump(s) for dedicated injection lines of the injection system) may be monitored (e.g., by SC 55) in real time. The pressure in the injection well(s) may be monitored via a downhole measurement device such as a pressure sensor 23 that is linked to the control unit, for example, via a fiber optic telemetry line or any other suitable communication technology.

If the control unit 52 (e.g., SC 55 thereof) determines there is a decline in injectivity for the injection well(s) penetrating one or more of the regions of the reservoir, the control unit 52 may select and/or be instructed to select a different operating envelope for the composition of the blended injection water stream(s) that is predicted to have a lower risk of causing formation damage (while maintaining an acceptable level of EOR from the region(s) of the reservoir) and may then adjust (e.g., via RCs 56 and the various associated valves and/or pumps) the blending ratios of the various blending streams such that the composition of the blended low salinity injection water injected into the injection well(s) penetrating the region(s) of the reservoir falls within the different operating envelope(s). The SC 55 of control unit 52 continues to monitor the downhole pressure in the injection well(s) penetrating the region(s) of the reservoir where there has been a decline in injectivity (or the flow rate downstream of the injection pump(s) for the dedicated injection lines leading to the injection well(s) penetrating the region(s) of the reservoir where there has been a decline in injectivity) in real time to determine if the pressure (or flow rate) begins to stabilize in response to injection of a blended low salinity injection water having a composition within the predetermined operating window. If not, the control unit 52 (e.g., SC 55 thereof) may initiate or be instructed to initiate further changes to the operation of the blending system to adjust the composition of the blended low salinity injection water stream(s) to fall within yet another operating envelope that is predicted to have yet a lower risk of causing formation damage. This process is iterative and may be repeated many times. Optionally, the control unit 52 (e.g., SC 55 thereof) may take a decision to reduce the flow rate of low salinity injection water or stop injecting low salinity injection water into the injection well(s) of one or more regions of the reservoir if the pressure continues to rise. The control unit 52 may then take the decision to inject a clay stabilizing composition (e.g., the undiluted clay stabilizing concentrate) into the oil-bearing layer(s) of the region(s) of the reservoir, where there has been a decline of injectivity, for a period of several days before recommencing the low salinity waterflood.

In embodiments, correlations are inputted (e.g., via CP 53 and/or SC 55) into the control unit 52 between the mixing ratios of the various blending streams and the compositions of the blended low salinity injection water stream(s) (for example, correlations between the mixing ratios of the various blending streams and one or more of the TDS, osmotic strength, concentrations of individual ions, concentrations of types of individual ions, ratios of individual ions and ratios of types of individual ions of the blended low salinity injection water stream). These correlations may be based on the assumption that the compositions for the NF permeate, RO permeate and optional high salinity water (e.g., SW and/or PW) blending stream remain substantially constant (within predetermined tolerances) during operation of the desalination plant. The mixing ratios of the various blending streams are dependent upon the flow rates of the various blending streams that are supplied to the blending point(s) of the blending system to form the blended low salinity injection water stream(s).

Correlations may also be inputted into the control unit 52 (e.g., via CP 53 and/or SC 55) between the opening degree of the NF permeate dump valve (e.g., valve V3), the opening degree of the RO permeate dump valve (e.g., valve V4), the opening degree of the adjustable valve(s) on the optional main high salinity water feed line (e.g., valve V9), the opening degree of the adjustable valve(s) on the optional PW inlet line (e.g., valve V6), and the opening degree of the adjustable valve(s) on the optional clay stabilizing concentrate line (e.g., valve V10) and the flow rates of NF permeate, RO permeate, optional high salinity water, optional PW, and optional clay stabilizing concentrate blending streams, for example measured by flow rate sensors Q7, Q6/Q6', Q5, Q11, and Q8, respectively. The control unit 52 may therefore control the blending ratios and hence the compositions of the blended low salinity injection water stream(s) by changing (e.g., via associated RC(s) 56) the opening degrees of one or more of the above-identified adjustable valves to achieve compositions for the blended low salinity injection water within the predefined (preselected or predetermined) operating envelope for the region(s) of the reservoir. As a result, the flow rates of the various blending streams to be supplied to the mixing point(s) may be adjusted in real time thereby ensuring the compositions of the blended low salinity injection water lies within the operating envelope for the region(s) of the reservoir.

Typically, the boundary values for the TDS of the blended low salinity injection water stream(s) (e.g., in line 18) may be in the range of 200 to 10,000 mg/L, for example from 500 to 10,000 mg/L. Generally, lower TDS ranges provide higher EOR, while higher TDS ranges mitigate the risk of formation damage, especially in reservoirs comprising rocks with high levels of swellable and/or migratable clays. Alternative boundary values for the TDS may be, for example, in the range of 500 to 5,000 mg/L, 500 to 3,000 mg/L, 1,000 to 2,000 mg/L, 2000 to 5000 mg/L, or 3000 to 7000 mg/L (depending on the risk of formation damage). The control unit 52 may control the compositions of the blended low salinity injection water(s) for the region(s) of the reservoir to within a selected range for the boundary values for the TDS.

Where there is a souring risk or scaling risk for the reservoir, the computerized control system of this disclosure can be utilized to control the sulfate anion concentration of the low salinity injection water(s) for the region(s) of the reservoir to a value of less than 50 mg/L, for example, less than 40 mg/L or less than 10 mg/L.

The herein-described computerized control system may further control the blending to attain a desired multivalent cation concentration in the blended injection water(s). Such desired multivalent cation concentration is described, for example, in International Patent Application No. PCT/

GB2007/003337 and published as WO/2008/029124, the disclosure of which is hereby incorporated herein by reference in its entirety for purposes not contrary to this disclosure. For example, in embodiments, the control unit 52 controls the total multivalent cation concentration of the blended injection water(s) (e.g., in line 18) for the region(s) of the reservoir to within the range of 1 to 250 mg/L, for example, 3 to 150 mg/L or 50 to 150 mg/L with the proviso that the ratio of the multivalent cation content of the blended low salinity injection water(s) to the multivalent cation content of the connate water contained in the pore space of the reservoir rock for each region of the reservoir is less than 1. In embodiments, the control unit 52 controls the calcium cation concentration of the blended injection water(s) for the region(s) of the reservoir to within the range of 1 to 200 mg/L, for example, 5 to 150 mg/L, or 50 to 150 mg/L, with the proviso that the ratio of the calcium cation content of the blended low salinity injection water(s) to the calcium cation content of the connate water contained in the pore space of the reservoir rock of each region of the reservoir is less than 1.

In embodiments, the control unit 52 controls the magnesium cation concentration of the blended injection water(s) for the region(s) of the reservoir to within the range of 2 to 400 mg/L, for example, from 10 to 300 mg/L, or from 100 to 300 mg/L, with the proviso that the magnesium cation content of the blended low salinity injection water(s) to the magnesium cation content of the connate water contained in the pore space of each region of the reservoir is less than 1.

In embodiments, the control unit 52 controls the potassium cation concentration of the blended injection water(s) for the region(s) of the reservoir to within the range of 10 to 2000 mg/L, for example, from 250 to 1000 mg/L, with the proviso that the TDS of the blended low salinity injection water(s) remains within the boundary values for the predefined operating envelope.

In embodiments, the control unit 52 may control the composition of the blended low salinity injection water within a selected range defined by boundary values for the TDS (and within selected ranges defined by boundary values for multivalent cation content, calcium cation content, magnesium cation content and potassium cations content).

The boundary values for the TDS and concentrations of individual ions and the concentration of any clay stabilizing additive for the blended low salinity injection water may vary depending on the low salinity EOR response for each region of the reservoir and the composition of the rock of the oil-bearing layer(s) of each region of the reservoir, and in particular, on the levels of swellable and migratable clays and minerals that are known to be linked to formation damage.

The boundary values may have been determined by analyzing samples of reservoir rock taken from each region of the oil-bearing layer of the reservoir. The samples of the reservoir rock may be rock cuttings, or a side wall core. Alternatively, the reservoir rock surrounding an injection wellbore may be analyzed by geophysical logging using a downhole logging apparatus. Analysis of the rock for each region of the oil-bearing layer of the reservoir may include, but is not limited to determining the whole rock clay content for reservoir rock surrounding the injection wellbore(s) in the first, second and any further regions of the reservoir. The whole rock clay content of the reservoir rock for the first, second and any further regions of the reservoir may be determined by geophysical logging, X-ray diffraction (XRD), scanning electron microscopy (SEM), infrared scintillation point counting or sieve analysis. The whole rock clay content of the reservoir rock may be in the range from about 2 weight % to about 20 weight %. Analysis of the rock for each region of the oil-bearing layer of the reservoir may also include determining the mineral content of the clay fraction of the rock, in particular, clays of the smectite type (such as montmorillonite), pyrophyllite type, kaolinite type, illite type, chlorite type and glauconite type, which can be determined by X-ray diffraction (XRD) or scanning electron microscopy (SEM) analysis. The optimal salinities (and compositions) for the blended low salinity injection water(s) for each region(s) of the reservoir may be determined from correlations of formation damage occurring with different salinity boundary values (and different concentrations of individual ions or types of individual ions) for the injection water for a range of rock samples with different clay contents and clay compositions and selecting boundary values for the salinity (or composition) of the blended low salinity injection water for a rock sample that most closely matches the composition of the rock (e.g., using historical data) for each region of the reservoir that is to be subjected to the low salinity waterflood. Alternatively, experiments may be performed on samples of the rock taken from the regions of the reservoir where the injection wells have been drilled using different boundary values for the salinity and composition (concentrations of individual ions or types of individual ions) for the blended low salinity injection water to determine an optimal envelope for the salinity and composition for the injection waters to be injected into each region of the reservoir during the low salinity waterflood.

Typically, the injection capacity for the blended low salinity injection water(s) is limited owing to the limited capacity of the desalination plant I, II. Accordingly, the low salinity waterflood may be designed to inject a low pore volume (PV) slug of the blended low salinity injection water into the injection well(s) penetrating the oil-bearing layer of each region of the reservoir in an amount of at least 0.3 pore volumes or at least 0.4 pore volumes as slugs having these minimum pore volumes tend to maintain their integrity within the formation. In order to limit the amount of water injected into each region of the reservoir from the injection well(s), the pore volume of the blended low salinity injection water may be less than 1, for example, less than or equal to 0.9 PV, less than or equal to 0.7 PV, less than or equal to 0.6 PV, less than or equal to 0.5 PV.

After injection of the low pore volume of the blended low salinity injection water into the injection well(s) penetrating a region of the reservoir, a drive water may be injected from the injection well(s) into the region of the oil-bearing layer of the reservoir to ensure that the slug of blended low salinity injection water (and hence the bank of released oil) is swept through the oil-bearing layer of the reservoir to a production well that penetrates the region of the oil bearing layer of the reservoir. In addition, the injection of the drive water may be required to maintain the pressure in the region of the reservoir. Typically, the drive water has a greater PV than the slug of aqueous displacement fluid.

In embodiments, the drive water is produced water or a mixture of seawater and produced water, depending on the amount of produced water separated from the produced fluids at a production facility. The use of produced water as a drive water is advantageous owing to the restrictions on disposal of produced water into the ocean that can limit the amount of produced water, that can be disposed of into the ocean or simply prevent the disposal or produced water into the ocean at all. Accordingly, following injection of the slug of low salinity injection water into the injection well(s)

penetrating a region of the reservoir, the injection well(s) may be used as a produced water disposal well.

Typically, different compositions for the blended low salinity injection water (TDS, concentrations of one or more individual ions, concentrations of types of individual ions, concentration ratios of individual ions, concentration ratios of types of individual ions or concentrations of one or more clay stabilizing additives) are correlated with different blend ratios for the combined RO/NF permeate stream. The different compositions are also correlated with different compositions for the combined RO/NF permeate streams (including compositions for the combined RO/NF permeate streams that include SW, PW and/or one or more clay stabilizing additives). These correlations may be inputted into the control unit 52 (e.g., into SC 55 via CP 53) so that the control unit may control (e.g., via RC(s) 56) the operation of the desalination plant to alter the blend ratios of the NF and RO permeate streams for the combined NF/RO permeate stream and the amounts of optional SW, PW, and/or clay stabilizing concentrate blended into the combined RO/NF permeate stream to provide a composition for the blended low salinity injection water(s) falling within the operating envelope(s) for the region(s) of the reservoir.

In embodiments, a computerized control system according to this disclosure is utilized to produce a controlled salinity injection water as described in U.S. Pat. No. 9,492,790, the disclosure of which is hereby incorporated herein by reference in its entirety for purposes not contrary to this disclosure. In such embodiments, the computerized control system as described in this disclosure may be utilized to control a process for the production of an injection water stream of controlled salinity and controlled sulfate anion concentration that is suitable for injection into an oil bearing formation of an oil reservoir, the process comprising the steps of: feeding a source water having a total dissolved solids content in the range of 20,000 to 45,000 ppm and a sulfate anion concentration in the range of from 1,000 to 4,000 ppm or from 1,500 ppm to 4,000 ppm to a desalination plant that comprises a plurality of reverse osmosis (RO) membrane units and a plurality of nanofiltration (NF) membrane units wherein the source water is pressurized to a pressure in the range of 350 to 1250 psi absolute, and dividing the source water to provide a feed water for the RO membrane units (hereinafter "RO feed water") and a feed water for the NF membrane units (hereinafter "NF feed water"); if necessary, increasing the pressure of the RO feed water to a value in the range of 900 to 1250 psi absolute before introducing the RO feed water to the RO membrane units and withdrawing an RO permeate and an RO retentate from the RO membrane units wherein the RO membrane units are operated in either a single-pass, single-stage mode or in a single-pass, two-stage mode and wherein the recovery of RO permeate is in the range of from 35 to 75% by volume or from 35 to 60% by volume based on the volume of the RO feed water that is fed to the RO membrane units such that the RO permeate has a total dissolved solids contents of less than 250 ppm, and a sulfate anion concentration of less than 3 ppm; if necessary, reducing the pressure of the NF feed water to a value in the range of 350 to 450 psi absolute before introducing the NF feed water to the NF membrane units and withdrawing an NF permeate and an NF retentate from the NF membrane units wherein the NF membrane units are operated in a single-pass, single-stage mode and wherein the NF membrane units are operated with a recovery of NF permeate in the range of 35 to 60% by volume based on the volume of the NF feed water that is fed to the NF membrane units such that the NF permeate has a total dissolved solids content in the range of from 15,000 to 60,000 ppm or from 15,000 to 45,000 ppm, and a sulfate anion concentration of less than 40 ppm or less than 30 ppm; and mixing at least a portion of the RO permeate and at least a portion of the NF permeate in a ratio in the range of from 2:1 to 40:1, from 4:1 to 27:1, or from 10:1 to 25:1 to provide an injection water having a total dissolved solids content in the range of from 500 to 5,000 ppm or from 1,000 to 5,000 ppm, and a sulfate anion concentration of less than 7.5 ppm, less than 5 ppm, or less than 3 ppm. The source water may be seawater, estuarine water, a produced water, an aquifer water, or a waste water. In embodiments, the total dissolved solids content (TDS) of the RO permeate is in the range of from 50 to 225 ppm, from 100 to 225 ppm, from 125 to 200 ppm, or from 150 to 175 ppm. In embodiments, the sulfate anion concentration of the RO permeate is in the range of from 0.5 to 2.5 ppm, or from 0.5 to 1.5 ppm. In embodiments, the TDS of the NF permeate is not more than 15,000 ppm or 10,000 ppm less than the TDS of the source water. In embodiments, the sulfate anion concentration of the NF permeate is in the range of from 10 to 28 ppm, from 10 to 25 ppm, or from 15 to 20 ppm.

The sulfate anion concentration of the injection water will be dependent upon the desired total dissolved solids content (TDS) for this stream and hence the mixing ratio for the RO permeate and NF permeate. Thus, the sulfate anion concentration of the injection water will increase with increasing amounts of NF permeate in the mixed stream. Typically, the sulfate anion concentration for an injection water stream having a total dissolved solids content of 1000 ppm is in the range of 1 to 2 ppm, and the values for the range for the sulfate anion concentration should be scaled for injection waters of higher TDS.

In addition to providing an injection water having a sufficiently high TDS to mitigate the risk of formation damage and having a sufficiently low sulfate concentration to mitigate the risk of souring in the reservoir, depending upon the choice of the source water, the injection water may also have a sufficiently low multivalent cation concentration for use as a low salinity injection water thereby achieving incremental oil recovery from the reservoir. Accordingly, in embodiments, the computerized control system of this disclosure is utilized to provide a mixed water stream of controlled salinity, controlled low sulfate anion concentration and controlled multivalent cation concentration for use as injection water for a low salinity waterflood whilst mitigating the risk of formation damage, and controlling souring in the reservoir. In such embodiments, the computerized control system of this disclosure is utilized to produce an injection water stream of controlled salinity, controlled sulfate anion concentration and controlled multivalent cation concentration that is suitable for injection into an oil bearing formation of an oil reservoir, by: feeding a source water having a total dissolved solids content in the range of 20,000 to 45,000 ppm, a sulfate concentration in the range of from 1,000 to 4,000 ppm or from 1,500 ppm to 4,000 ppm, and a multivalent cation concentration in the range of from 700 to 3,000 ppm, from 1,000 to 3,000 ppm, or from 1,500 to 2,500 ppm to a desalination plant that comprises a plurality of reverse osmosis (RO) membrane units and a plurality of nanofiltration (NF) membrane units wherein the source water is pressurized to a value in the range of 350 to 1250 psi absolute, and dividing the source water to provide an RO feed water and an NF feed water; if necessary, increasing the pressure of the RO feed water to a value in the range of 900 to 1250 psi absolute before introducing the RO feed water to the RO membrane units and withdrawing an RO permeate and an RO retentate from the RO membrane units wherein the RO membrane units are operated in either a single-pass, single-stage mode or in a single-pass, two-stage mode and wherein the recovery of RO permeate is in the range of from 35 to 75% by volume, or from 35 to 65% by volume based on the volume of the RO feed water that is fed to the RO membrane units such that the RO permeate has a total dissolved solids contents of less than 250 ppm, a sulfate anion concentration of less than 3 ppm, and a multivalent cation content of up to 10 ppm; if necessary, reducing the pressure of the NF feed water to a value in the range of 350 to 450 psi absolute before introducing the NF feed water to the NF membrane units and withdrawing an NF permeate and an NF retentate from the NF membrane units wherein the NF membrane units are operated in a single-pass, single-stage mode with a recovery of NF permeate in the range of from 35 to 60% by volume based on the volume of the NF feed water that is fed to the NF membrane units such that the NF permeate has a total dissolved solids content in the range of from 15,000 to 40,000 ppm or from 15,000 to 35,000 ppm, a sulfate anion concentration of less than 40 ppm or less than 30 ppm and a multivalent cation content of up to 200 ppm, up to 150 ppm, or up to 100 ppm; and mixing at least a portion of the RO permeate and at least a portion of the NF permeate in a ratio in the range of from 2:1 to 40:1, from 4:1 to 27:1, or from 10:1 to 25:1 to provide an injection water having a total dissolved solids content in the range of from 500 to 5,000 ppm or from 1,000 to 5,000 ppm, a sulfate anion concentration of less than 7.5 ppm, less than 5 ppm, or less than 3 ppm and a multivalent cation content of up to 50 ppm. Again, the source water may seawater, estuarine water, a produced water, an aquifer water, or a waste water. The TDS for the source water, the RO permeate, the NF permeate and the injection water may be as given above. In embodiments, the source water has a calcium cation concentration in the range of from 200 to 600 ppm. In embodiments, the source water has a magnesium cation concentration in the range of from 500 to 2000 ppm. The concentrations of sulfate anions in the RO permeate, NF permeate and injection water may be as given above. In embodiments, the concentration of multivalent cations in the RO permeate is in the range of from 1 to 10 ppm, from 1 to 5 ppm, or from 1 to 3 ppm. In embodiments, the concentration of multivalent cations in the NF permeate is in the range of from 50 to 200 ppm or from 50 to 150 ppm. The concentration of multivalent cations in the injection water will be dependent upon the desired TDS for this stream and hence the mixing ratio for the RO permeate and NF permeate. Thus, the multivalent cation concentration of the injection water will increase with increasing amounts of NF permeate in the mixed stream. Typically, the multivalent cation concentration for an injection water stream having a total dissolved solids content of 1000 ppm is in the range of 2 to 10 ppm, and the values for the range of multivalent cation concentration should be scaled for injection waters of higher TDS. Alternatively or additionally, the NF source water can, in embodiments, be an intermediate stream from an RO skid such as the reject/retentate from a first RO array, thus resulting in a proportionate increase in the TDS and ion concentration of the NF permeate.

As discussed above, where it is desired to achieve enhanced oil recovery with a low salinity injection water, the ratio of the multivalent cation concentration of the low salinity injection water to the multivalent cation concentration of the connate water should be less than 1. The multivalent cation concentration of a connate water is typically several times greater than the multivalent cation concentration of the injection water formed by mixing the RO permeate and the NF permeate according to the process of the present invention. Accordingly, the injection water has the desired low salinity and desired low multivalent cation concentration to achieve enhanced oil recovery when injected into a hydrocarbon-bearing formation of a reservoir whilst having a sufficient content of total dissolved solids to prevent formation damage and a sufficiently low sulfate concentration to mitigate the risk of souring in the reservoir (as well as mitigating the risk of precipitation of insoluble mineral salts in the formation and/or production wells).

Typically, the formation into which the injection water of controlled salinity (controlled TDS), controlled low sulfate anion concentration and controlled low multivalent cation concentration is injected is an oil-bearing sandstone formation that contains a high content of swelling clays, for example, smectite clays. By high content of swelling clays is meant a content of swelling clays of 10% by weight or greater, for example, a content of swelling clays in the range of 10 to 30% by weight.

In embodiments, the RO permeate and the NF permeate are mixed in a volume ratio (volume of RO permeate to volume of NF permeate) of from 2:1 to 40:1, from 4:1 to 27:1, or from 10:1 to 25:1. The person skilled in the art will understand that the particular mixing ratio will depend on a one or more of the following factors: (a) the salinity of the source water; (b) the sulfate concentration of the source water; (c) the multivalent cation concentration of the source water, (d) the temperature at which the RO and NF membrane units are operated; (e) the percentage volume recovery at which the RO and NF membrane units are operated; (f) the desired salinity of the injection water; (g) the desired sulfate anion concentration of the injection water; and (h) the desired multivalent cation concentration of the injection water. Factors (f), (g) and (h) are, in turn, dependent on characteristics of the reservoir into which it is desired to inject the treated water such as the amount of swelling clays, the levels and characteristics of sulfate reducing bacteria (SRB), and the multivalent cation concentration of the connate water. Thus, depending on the mixing ratio of the RO permeate to the NF permeate, the injection water stream will have a salinity sufficient to control formation damage, a sufficiently low sulfate concentration to control souring in the oil reservoir, and a sufficiently low multivalent cation concentration that the ratio of the multivalent cation concentration of the injection water to that of the connate water of the formation is less than 1.

Advantageously, the ratio of mixing of the RO permeate and the NF permeate is controlled via control system 52 in accordance with a measured variable provided from sensors S, Q to the RCs 56 and monitored by the supervisory controller 55 and/or a trend of a measured or calculated value from RCs 56 monitored by the supervisory controller(s) 55 in coordination with the measured or calculated value(s) from the regulatory controller(s). The control may be automatic or semi-automatic (e.g., via user input via CP 53), utilizing the supervisory controller(s) 55, and the regulatory controllers 56 and the feed-back control system described hereinabove. As described hereinabove, the measured variable may be one or more properties of the injection water, for example, the measured variable may relate to the salinity (TDS content) of the injection water, and may be the conductivity of the injection water. The conductivity is a measure of the TDS content of the injection water. Alternatively, or additionally, the measured variable may relate to the concentration of multivalent anions in the injection water or in the NF permeate, or the concentration of selected divalent anions, such as sulfate anions, in the injection water or in the NF permeate. Alternatively, or additionally, the measured variable may relate to the concentration of multivalent cations in the injection water or in the NF permeate, or the concentration of selected multivalent cations, such as calcium cations and/or magnesium cations in the injection water or in the NF permeate. As noted hereinabove, the flow rate of the injection water stream (e.g., in line 18 and/or 58) or of the source water stream (e.g., in line 30 and/or 2) may also be controlled in accordance with a measured variable (e.g., via one or more variables measured by sensors S or flow rate sensors Q).

By "single-pass, single-stage" mode is meant that the feed water is passed through a plurality of individual membrane units that are arranged in parallel. Thus, a feed water is passed to each of the membrane units and a permeate stream and a retentate stream is removed from each of the membrane units. The permeate streams are then combined to form a combined permeate stream. The percentage recovery of the membrane units when operated in "single-pass, single stage" mode is: [(volume of the combined permeate stream/ the volume of the feedwater)×100]. These volumes are determined over a set time period, for example, volume of feed water processed in one day and volume of combined permeate stream produced in one day.

By "single-pass, two stage" mode is meant that that the feed water is fed to the first of two membrane units that are arranged in series with the retentate from the first membrane unit being used as feed water to the second membrane unit in the series. Typically, there may be a plurality of first membrane units that are arranged in parallel and a plurality of second membrane units arranged in parallel. Generally, there will be fewer second membrane units than first membrane units as the second membrane units will process a smaller volume of water over a set time period than the first membrane units. Typically, the permeate streams from the first membrane units are mixed to give a first permeate stream and the retentate streams from the first membrane units are mixed to form a first retentate stream. The first retentate stream is then used as feed water to the plurality of second membrane units that are arranged in parallel. The permeate streams from the second membrane units are then typically mixed to give a second permeate stream. The second permeate stream is then combined with the first permeate stream to give a combined permeate stream. The retentate streams from the second membrane units are typically mixed to give a combined retentate stream that is discharged from the desalination plant. However, there are other ways of combining the various streams when operating a plurality of membrane units in a "single-pass, two stage" mode that are within the common general knowledge of the person skilled in the art.

The percentage recovery of the membrane units when operated in "single pass, two stage" mode is: [(volume of the first permeate stream from the first membrane units+volume of the second permeate stream from the second membrane units)/the volume of the feedwater to the first membrane units))×100]. These volumes are determined over a set time period of, for example, one day.

In embodiments, the NF membrane units are operated in "single-pass, single-stage" mode. In embodiments, the RO membrane units are operated in either "single-pass, single-stage" mode or "single pass, two stage" mode, in particular, "single-pass, single-stage" mode.

The computerized control system and method of this disclosure may be utilized, in embodiments, to provide a low salinity injection water within a desired compositional envelope. Such a computerized control system and method may be particularly applicable during commissioning of a well, and the computerized control system and method of this disclosure may be utilized, in embodiments, to commission a well via control of the composition of a low salinity injection water utilized during commissioning of a well.

Additional Disclosure

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments Disclosed Herein Include:

A: A control system configured to control the operation of one or more reverse osmosis (RO) arrays, one or more nanofiltration (NF) arrays, a blending system, or a combination thereof within a desalination plant, wherein the control system comprises: a control panel (CP); a plurality of regulatory controllers (RCs); and a supervisory controller (SC), wherein the SC is in signal communication with the CP, and with each of the plurality of RCs, wherein the SC is configured to: receive user inputs from the CP, and receive inputs from the plurality of RCs regarding data from a plurality of sensors within the desalination plant, wherein each of the plurality of RCs is in signal communication with the plurality of sensors, wherein the plurality of RCs is configured to: receive data from one or more of the plurality of sensors, provide outputs to and receive permissions from the SC, and instruct one or more of a plurality of devices of the desalination plant in response to the received permissions from the SC, and wherein the SC is configured to:

monitor trends in the inputs regarding and/or predict outcomes from data received from the plurality of RCs and determine the permissions for each of the RCs based on the monitored trends, user inputs from the CP, or a combination thereof.

B: A desalination plant comprising: a water inlet line; one or more reverse osmosis (RO) arrays in fluid communication with the water inlet line, wherein each of the one or more RO arrays is configured to receive an RO feed water and produce an RO permeate and an RO concentrate; a nanofiltration (NF) array in fluid communication with the water inlet line, the one or more RO arrays, or both, wherein the NF array is configured to produce an NF permeate and an NF concentrate; a blending system, wherein the blending system comprises: an RO permeate feed line, an NF permeate feed line, a blending point configured to blend RO permeate from the RO permeate feed line and NF permeate from the NF permeate feed line to form a blended low salinity injection water, and a discharge line configured to deliver the blended low salinity injection water to an injection system; a plurality of valves and pumps configured to adjust the flow rates or pressures of various streams within the desalination plant; a plurality of sensors configured to measure the flow rate, pressure, temperature, composition, or a combination thereof of various streams within the desalination plant; a control system, wherein the control system is configured to: control the operation of the one or more RO arrays, the NF array, and the blending system to within operating parameters, and maintain a composition of the blended low salinity injection water within an operating envelope, wherein the control system comprises a plurality of regulatory controllers (RCs), a supervisory controller (SC), and a control panel, wherein the SC is in electronic communication with the CP from which it receives user inputs and with each of the plurality of RCs from which it receives inputs regarding the data from the sensors, wherein each of the plurality of RCs receives data from one or more of the plurality of sensors, provides outputs to and receives permissions from the SC, and instructs one or more of the plurality of valves and pumps in response to the received permissions from the SC, and wherein the SC monitors trends in the inputs received from the plurality of RCs and determines permissions for each of the RCs based on the monitored trends, user inputs from the control panel, or a combination thereof C: A method of producing injection water, the method comprising: producing a reverse osmosis permeate stream; producing a nanofiltration permeate stream; blending at least a portion of the reverse osmosis permeate stream with at least a portion of the nanofiltration permeate stream, a high salinity stream, or a combination thereof to provide a blended low salinity water stream; and controlling the production of the RO permeate stream, the NF permeate stream, and the blending to within operating parameters, and maintaining a composition of the blended low salinity water stream within an operating envelope via a control system comprising a plurality of regulatory controllers (RCs), a supervisory controller (SC), and a control panel, wherein the SC is in signal communication with the CP from which it receives user inputs and with each of the plurality of RCs from which it receives inputs regarding data from a plurality of sensors, wherein each of the plurality of RCs receives data from one or more of the plurality of sensors, provides outputs to and receives permissions from the SC, and instructs one or more of a plurality of valves and pumps in response to the received permissions from the SC, and wherein the SC monitors trends in the inputs regarding the data received from the plurality of RCs and determines permissions for each of the RCs based on the monitored trends, user inputs from the control panel, or a combination thereof.

D: A method of controlling a composition of an injection fluid, the method comprising: receiving, by a supervisory controller (SC) of a control system, one or more composition parameter targets for an injection fluid; and automatically adjusting, via communication of permissions from the supervisory controller to one or more regulatory controllers (RCs) of the control system in communication with one or more valves within a desalination plant, a state of the one or more valves, to produce an injection fluid meeting the one or more composition parameters.

Each of embodiments A, B, C, and D may have one or more of the following additional elements:

Element 1: wherein the plurality of sensors are selected from: ion concentration sensors configured to measure at least one of conductivity, salinity, total concentration of dissolved ions, and/or concentrations of individual ions (Ci) in various flow lines of the desalination plant, temperature sensors configured to measure the temperature in various flow lines within the desalination plant, pressure sensors configured to measure the pressure in various flow lines within the desalination plant, flow rate sensors configured to measure the flow rate of various flow lines within the desalination plant, or a combination thereof. Element 2: wherein the various flow lines include one or more selected from RO array feed lines, NF array feed lines, RO permeate lines, NF permeate lines, RO concentrate lines, NF concentrate lines, combined RO/NF permeate lines, blended low salinity water stream lines, RO array permeate dump lines, NF array permeate dump lines, combined RO/NF permeate dump lines, ion concentrate feed lines, feed water bypass lines, produced water (PW) blending lines, or a combination thereof. Element 3: wherein the sensors are configured to provide to the RCs data on, wherein the RCs provide outputs to the SC of, and/or wherein the SC monitors trends in one or more operating parameters selected from: a degree of fouling of RO membranes of one or more RO arrays, NF membranes of one or more NF arrays, or both; a feed pressure to one or more RO arrays, one or more NF arrays, or both; a rate of change of feed pressure to one or more RO arrays, one or more NF arrays, or both; a feed flow rate to one or more RO arrays, one or more NF arrays, or both; a pressure of a concentrate from one or more RO arrays, one or more NF arrays, or both; a pressure of a permeate from one or more RO arrays, one or more NF arrays, or both; a differential pressure across one or more RO arrays, one or more NF arrays, or both; a conductivity of a permeate from one or more RO arrays, one or more NF arrays, or both; a total dissolved solids (TDS) of a permeate from one or more RO arrays, one or more NF arrays, or both; a temperature of a permeate from one or more RO arrays, one or more NF arrays, or both; a permeate flow rate from one or more RO arrays, one or more NF arrays, or both; a concentrate flow rate from one or more RO arrays, one or more NF arrays, or both; a recovery from one or more RO arrays, one or more NF arrays, or both; a flow rate, salinity, conductivity, and/or TDS of a feed water bypass stream, a flow rate, salinity, conductivity, and/or TDS of a produced water (PW) blending stream, a flow rate, salinity, conductivity, and/or TDS of the blended low salinity water stream, or a combination thereof. Element 4: wherein the plurality of devices comprise a plurality of valves and pumps, wherein the plurality of valves and pumps comprise one or more of: one or more valves and/or pumps on a feed line to an RO array, an NF array, or a combination thereof; one or more valves and/or pumps on a permeate line from an RO array, an NF array, or a combination thereof; one or more valves and/or pumps on a permeate feed line from an RO array, an NF array, or both to the blending system; one or more valves and/or pumps on a concentrate line from an RO array, an NF array, or a combination thereof; one or more valves and/or pumps on a combined RO/NF permeate line; one or more valves and/or pumps on a blended low salinity water stream line from the blending system; one or more valves and/or pumps on an ion concentrate line that introduces an ion concentrate from an ion concentrate tank to the blending system; one or more valves and/or pumps on a permeate dump line from an RO array, an NF array, or both; one or more valves and/or pumps on a feed water bypass line from a feed water source to the blending system; one or more valves and/or pumps on a PW blending line to the blending system; or a combination thereof. Element 5: wherein the valves include one or more valves configured to selectively combine at least a portion of the RO permeate with at least a portion of the NF permeate to produce an injection water having the composition within the operating envelope. Element 6: further comprising: a by-pass line coupled to the water inlet line and the blending system, a PW blending inlet line fluidly connected with the blending system, or both, wherein valves further comprise one or more valves configured to selectively combine at least a portion of a feed water from the water inlet line, at least a portion of the PW in the PW blending line, or both with RO permeate from the RO permeate feed line and NF permeate from the NF permeate feed line to produce the injection water having the composition within the operating envelope. Element 7: wherein the feed water comprises a greater concentration of divalent cations than the RO permeate. Element 8: wherein the sensors are selected from temperature sensors, pressure sensors, flow rate sensors, ion concentration sensors configured to measure at least one of conductivity, salinity, total concentration of dissolved ions, or concentrations of individual ions (Ci), or a combination thereof. Element 9: wherein the sensors include one or more flow rate sensors, one or more pressure sensors, or a combination thereof. Element 10: wherein the one or more flow rate sensors, the one or more pressure sensors, or the combination thereof include sensors configured to measure flow rate, pressure, or both of at least one of: the RO permeate, the NF permeate, the blended low salinity injection water, a feed water bypass stream, a produced water (PW) blending stream, an ion concentrate stream, or a combination thereof. Element 11: further comprising a vessel containing an ion concentrate, wherein the valves include one or more valves configured to blend the ion concentrate with at least one of the reverse osmosis permeate, the nanofiltration permeate, the feed water, or the blended low salinity injection water to produce the composition within the operating envelope. Element 12: further comprising at least one of an RO permeate dump line configured to pass an unused portion of the RO permeate out of the desalination plant, an NF permeate dump line configured to pass an unused portion of the NF permeate out of the desalination plant, or a feed water by-pass line dump line configured to pass an unused portion of a feed water by-pass stream out of the desalination plant. Element 13: further comprising: utilizing the control system to control dumping of a portion of the RO permeate stream from a desalination plant; dumping of a portion of the NF permeate stream from the desalination plant, or a combination thereof to provide the blended low salinity water stream having the composition within the operating envelope. Element 14: wherein the RO permeate stream and the NF permeate stream are produced from a feed water, and wherein the high salinity stream comprises at least a portion of the feed water, a produced water (PW) stream, or a combination thereof. Element 15: wherein the composition comprises a sulfate anion concentration below a sulfate concentration threshold. Element 16: wherein the blending further comprises blending at least a portion of an ion concentrate with the at least a portion of the RO permeate stream, the at least a portion of the nanofiltration permeate stream, the high salinity stream, or the combination thereof to provide the blended low salinity water stream. Element 17: wherein the one or more composition parameters comprise a total dissolved solids content of the injection fluid. Element 18: wherein automatically adjusting the state of the one or more valves comprises adjusting one or more valves to vary a flow rate of an RO permeate, an NF permeate, a PW stream, a feed water bypass stream, an ion concentrate stream, or a combination thereof blended to provide the injection fluid.

While certain embodiments have been shown and described, modifications thereof can be made by one skilled in the art without departing from the teachings of this disclosure.

Numerous other modifications, equivalents, and alternatives, will become apparent to those skilled in the art once the above disclosure is fully appreciated. It is intended that the following claims be interpreted to embrace such modifications, equivalents, and alternatives where applicable. Accordingly, the scope of protection is not limited by the description set out above but is only limited by the claims which follow, that scope including equivalents of the subject matter of the claims.

What is claimed is:

1. A desalination plant for producing a low salinity injection water of desired composition for an oil reservoir, comprising:
   a water inlet line;
   at least one bypass line coupled to a respective bypass line valve;
   at least one reverse osmosis (RO) feed line coupled to a respective RO feed line valve;
   at least one nanofiltration (NF) feed line coupled to a respective NF feed line valve;
   at least one RO concentrate line coupled to a respective RO concentrate line valve;
   one or more RO arrays in fluid communication with the water inlet line, wherein each of the one or more RO arrays is configured to receive an RO feed water and produce an RO permeate and an RO concentrate;
   one or more NF arrays in fluid communication with the water inlet line, the one or more RO arrays, or both, wherein the NF array is configured to produce a NF permeate and an NF concentrate;
   a blending system, wherein the blending system comprises:
      at least one RO permeate line,
      at least one NF permeate line,
      a blending point communicating with the at least one RO permeate line, the at least one NF permeate line, a combined RO/NF permeate line, a produced water (PW) blending line coupled to a PW blending line valve, and a low salinity injection water line configured to blend RO permeate from the at least one RO permeate line and NF permeate from the at least one NF permeate line to form a blended low salinity injection water in the low salinity injection water line,
an injection pump, and
a discharge line configured to deliver the blended low salinity injection water to an injection system;
a control system integrated with the desalination plant and configured to control operation of the one or more RO arrays, the one or more NF arrays, the blending system, or a combination thereof within the desalination plant, wherein the control system comprises:
a control panel (CP);
a plurality of regulatory controllers (RCs); and
a supervisory controller (SC), wherein the SC is in signal communication with the CP, and with each of the plurality of RCs, wherein the SC is configured to: receive user inputs from the CP, and receive inputs from the plurality of RCs regarding data from a plurality of sensors within the desalination plant,
the plurality of sensors, wherein each of the plurality of RCs is in signal communication with the plurality of sensors, wherein the plurality of RCs is configured to: receive data from the plurality of sensors, provide outputs to and receive permissions from the SC, and instruct a plurality of devices of the desalination plant in response to the received permissions from the SC, wherein the plurality of sensors comprises sensors configured to measure flow rate, pressure, or both of: the RO permeate, the NF permeate, the blended low salinity injection water, a feed water bypass stream, a PW blending stream, and an ion concentrate stream;
wherein the SC is configured to: monitor trends in the inputs regarding and/or predict outcomes from data received from the plurality of RCs and determine the permissions for each of the RCs based on the monitored trends, user inputs from the CP, or a combination thereof, and
the plurality of devices;
the one or more RO arrays;
the one or more NF arrays; and
the blending system, wherein the plurality of devices comprises a plurality of valves and pumps, and
wherein the control system is configured to receive signals from the sensors on the at least one RO feed line, the at least one NF feed line, the RO permeate line, the combined RO permeate line, and the bypass line to control valves on the at least one RO feed line, the at least one NF feed line, the bypass line and the PW blending line to produce an injection water having a composition within an operating envelope via an injection line.

2. The desalination plant of claim 1, wherein the plurality of sensors are selected from:
ion concentration sensors configured to measure at least one of conductivity, salinity, total concentration of dissolved ions, and/or concentrations of individual ions (Ci) in various flow lines of the desalination plant, temperature sensors configured to measure the temperature in various flow lines within the desalination plant, pressure sensors configured to measure the pressure in various flow lines within the desalination plant, flow rate sensors configured to measure the flow rate of various flow lines within the desalination plant, or a combination thereof.

3. The desalination plant of claim 2, wherein the various flow lines include one or more selected from RO array feed lines, NF array feed lines, RO permeate lines, NF permeate lines, RO concentrate lines, NF concentrate lines, combined RO/NF permeate lines, blended low salinity water stream lines, RO array permeate dump lines, NF array permeate dump lines, combined RO/NF permeate dump lines, ion concentrate feed lines, feed water bypass lines, blending lines, or a combination thereof.

4. The desalination plant of claim 3, wherein the sensors are configured to provide to the RCs data on, wherein the RCs provide outputs to the SC of, and/or wherein the SC monitors trends in one or more operating parameters selected from: a degree of fouling of RO membranes of one or more RO arrays, NF membranes of one or more NF arrays, or both; a feed pressure to one or more RO arrays, one or more NF arrays, or both; a rate of change of feed pressure to one or more RO arrays, one or more NF arrays, or both; a feed flow rate to one or more RO arrays, one or more NF arrays, or both; a pressure of a concentrate from one or more RO arrays, one or more NF arrays, or both; a pressure of a permeate from one or more RO arrays, one or more NF arrays, or both; a differential pressure across one or more RO arrays, one or more NF arrays, or both; a conductivity of a permeate from one or more RO arrays, one or more NF arrays, or both; a total dissolved solids (TDS) of a permeate from one or more RO arrays, one or more NF arrays, or both; a temperature of a permeate from one or more RO arrays, one or more NF arrays, or both; a permeate flow rate from one or more RO arrays, one or more NF arrays, or both; a concentrate flow rate from one or more RO arrays, one or more NF arrays, or both; a recovery from one or more RO arrays, one or more NF arrays, or both; a flow rate, salinity, conductivity, and/or TDS of the feed water bypass stream, a flow rate, salinity, conductivity, and/or TDS of the PW blending stream, a flow rate, salinity, conductivity, and/or TDS of the blended low salinity water stream, or a combination thereof.

5. The desalination plant of claim 1, wherein the plurality of valves and pumps comprise one or more of: one or more valves and/or pumps on a feed line to an RO array, an NF array, or a combination thereof, one or more valves and/or pumps on a permeate line from an RO array, an NF array, or a combination thereof, one or more valves and/or pumps on the RO permeate feed line from an RO array, an NF array, or both to the blending system; one or more valves and/or pumps on a concentrate line from an RO array, an NF array, or a combination thereof, one or more valves and/or pumps on a combined RO/NF permeate line; one or more valves and/or pumps on a blended low salinity water stream line from the blending system; one or more valves and/or pumps on an ion concentrate line that introduces an ion concentrate from an ion concentrate tank to the blending system; one or more valves and/or pumps on a permeate dump line from an RO array, an NF array, or both; one or more valves and/or pumps on a feed water bypass line from a feed water source to the blending system; one or more valves and/or pumps on the PW blending line to the blending system; or a combination thereof.

6. The desalination plant of claim 1, wherein the valves include the one or more valves configured to selectively combine at least a portion of the RO permeate with at least a portion of the NF permeate to produce the injection water having the composition within the operating envelope.

7. The desalination plant of claim 1, further comprising:
the by-pass line coupled to the water inlet line and the blending system, a PW blending inlet line fluidly connected with the blending system, or both, wherein valves further comprise one or more valves configured to selectively combine the at least a portion of the feed water from the feed water inlet line, the at least a portion of the PW in the PW blending line, or both with the RO permeate from the RO permeate feed line and the NF permeate from the NF permeate feed line to produce the injection water having the composition within the operating envelope.

8. The desalination plant of claim 7, wherein the feed water comprises a greater concentration of divalent cations than the RO permeate.

9. The desalination plant of claim 1, wherein the sensors are selected from temperature sensors, pressure sensors, flow rate sensors, ion concentration sensors configured to measure at least one of conductivity, salinity, total concentration of dissolved ions, or concentrations of individual ions (Ci), or a combination thereof.

10. The desalination plant of claim 1, wherein the sensors include one or more flow rate sensors, one or more pressure sensors, or a combination thereof.

11. The desalination plant of claim 1, further comprising a vessel containing an ion concentrate, wherein the valves include one or more valves configured to blend the ion concentrate with at least one of the RO permeate, the NF permeate, the feed water, or the blended low salinity injection water to produce the composition within the operating envelope.

12. The desalination plant of claim 1, further comprising at least one of an RO permeate dump line configured to pass an unused portion of the RO permeate out of the desalination plant, an NF permeate dump line configured to pass an unused portion of the NF permeate out of the desalination plant, or a feed water by-pass line dump line configured to pass an unused portion of a feed water by-pass stream out of the desalination plant.

* * * * *